United States Patent
Nakajima

(10) Patent No.: US 9,020,473 B2
(45) Date of Patent: Apr. 28, 2015

(54) CONTENT SHARING SYSTEM, MOBILE TERMINAL, PROTOCOL SWITCHING METHOD AND PROGRAM

(75) Inventor: Kazuaki Nakajima, Tokyo (JP)

(73) Assignee: NEC Corporation, Tokyo (JP)

( * ) Notice: Subject to any disclaimer, the term of this patent is extended or adjusted under 35 U.S.C. 154(b) by 214 days.

(21) Appl. No.: 13/881,010

(22) PCT Filed: Aug. 3, 2011

(86) PCT No.: PCT/JP2011/067733
§ 371 (c)(1),
(2), (4) Date: Apr. 23, 2013

(87) PCT Pub. No.: WO2012/056783
PCT Pub. Date: May 3, 2012

(65) Prior Publication Data
US 2013/0210397 A1    Aug. 15, 2013

(30) Foreign Application Priority Data
Oct. 25, 2010   (JP) .................................. 2010-238286

(51) Int. Cl.
*H04W 8/22* (2009.01)
*H04W 52/02* (2009.01)

(52) U.S. Cl.
CPC ............ *H04W 8/22* (2013.01); *H04W 52/0203* (2013.01); *H04W 52/0209* (2013.01); *Y02B 60/50* (2013.01)

(58) Field of Classification Search
CPC ............................ H04W 8/22; H04W 52/0203
USPC ...................... 455/414.1–414.4, 550.1–552.1; 358/1.15, 1.16
See application file for complete search history.

(56) References Cited

U.S. PATENT DOCUMENTS

| 7,463,726 B2 * | 12/2008 | Jensen et al. ............. 379/114.02 |
| 2006/0223442 A1 * | 10/2006 | Stephens ..................... 455/67.11 |
| 2007/0076245 A1 * | 4/2007 | Sugimoto et al. ............ 358/1.15 |

FOREIGN PATENT DOCUMENTS

| JP | 2001-292138 A | 10/2001 |
| JP | 2002-247130 A | 8/2002 |

(Continued)

OTHER PUBLICATIONS

Nakazawa et al., "Terminal Application Platform for Achieving IMS Service", OKI Technical Review No. 210, Apr. 2007, OKI Electric Industry Co., Ltd.

(Continued)

*Primary Examiner* — Kashif Siddiqui
(74) *Attorney, Agent, or Firm* — Sughrue Mion, PLLC

(57) ABSTRACT

A content sharing system in which a plurality of terminal devices that enable voice calls and data communication to each other, switching equipment that mediates the voice calls, and a content sharing server that mediates the data communication are connected to each other, each mobile device comprising: a voice call module, a content sharing application that generates incremental update commands in response to one user operation and sends the incremental update commands to another mobile device with respect to the same content; first and second communication control units that perform data communication according to first and second communication protocols; and a protocol selection unit that sends a desired protocol to the content sharing server according to the status of the terminal device, receives the determined protocol and switches the communication protocol to this protocol.

12 Claims, 19 Drawing Sheets

(56) References Cited

FOREIGN PATENT DOCUMENTS

| JP | 2005-348262 A | 12/2005 |
| JP | 4273899 B2 | 6/2009 |
| JP | 2010-50617 A | 3/2010 |
| JP | 2010-56632 A | 3/2010 |
| WO | 2005/093593 A1 | 10/2005 |

OTHER PUBLICATIONS

International Search Report for PCT/JP2011/067733 dated Sep. 6, 2011.

* cited by examiner

FIG. 3

| PROTOCOL SELECTION DATA | 38a CALL STATE | 38b BATTERY REMAINING AMOUNT | 38c CHARGER CONNECTION | 38d UPDATE FREQUENCY | 38e DESIRED PROTOCOL |
|---|---|---|---|---|---|
| 38 | CALLING | HIGH | CONNECTED | LOW | SIP |

CONTENT SHARING SYSTEM, MOBILE TERMINAL, PROTOCOL SWITCHING METHOD AND PROGRAM

CROSS REFERENCE TO RELATED APPLICATIONS

This application is a National Stage of International Application No. PCT/JP2011/067733 filed Aug. 3, 2011, claiming priority based on Japanese Patent Application No. 2010-238286 filed Oct. 25, 2010, the contents of all of which are incorporated herein by reference in their entirety.

TECHNICAL FIELD

The present invention relates to a content sharing system, a mobile terminal, a protocol switching method, and a program thereof and, more specifically, to a content sharing system and the like capable of suppressing consumption of server resources while reducing the power consumption. In more details, the present invention relates to a content sharing system for performing communication between terminals via a server, which makes it possible to dynamically switch protocols (MSRP and the like capable of performing push-type communication) used in communication between the first protocol (HTTP and the like which require polling) and the second protocol in accordance with the state regarding whether or not voice communication is started, the frequency of the communication, the realtime property required by the user, the remaining capacitance of batteries, and the like.

BACKGROUND ART

A content sharing system using mobile communication with mobile telephone terminals operated by batteries can reflect the operations from both terminals upon the same content stored in both of the mobile telephone terminals that are communicating with each other. More specifically, a chat service by using characters, a bulletin board service, a service with which photographs are mutually sent and shared, and a service with which hand-written characters and the like are written mutually, for example, can be achieved by the content sharing system.

With one-on-one communication or communication among a large number of users in particular with this type of services, it is required to increase the realtime property of the bidirectional operations via the mobile telephone terminals. For example, in a case where the same content shared between the terminals is a still image such as a photograph, the content sharing system transmits operations such as writing of hand-written characters, expansion/contraction, and the like executed on the image from one of the terminals to the other terminal in a real time manner as an incremental update command, and reflects the result of the operation on the same content stored in the other terminal. It is required to be able to perform the incremental update action in a realtime manner. In order to do that, it is necessary to establish and maintain a session (connection) between the both terminals or to perform regular polling with high frequency.

FIG. 19 is an explanatory chart showing the structure of an existing content sharing system 1001. The content sharing system 1001 is so structured that terminals 1020a, 1020b, a content sharing server 1010, and switching equipment 1040 can be connected to each other via a network 1002. The terminals 1020a and 1020b are more specifically mobile telephone terminals, smartphone terminals, personal computer terminals, and the like.

The terminals 1020a and 1020b can perform a voice call and data communication simultaneously via the network 1002, the content sharing server 1010 mediates the data communication between the terminals, and the switching equipment 1040 mediates the voice call between the terminals. The voice call may use the network 1020 same as the data communication or may use a different telephone network.

A content sharing application 1032 is operated in each of the terminals 1020a and 1020b. Further, a content 1031 as the same data is stored in both terminals. The content 1031 may be any data on which some kind of operations can be done with the terminals 1020a and 1020b, such as still images, videos, music, word-processed documents, spreadsheets, and the like.

When some kind of operation is executed by a user of one of the terminals 1020 and 1020b on the content 1031 via the content sharing application 1032, the content sharing application 1032 generates an incremental update command showing the content of the operation and transmits the incremental update command from one of the terminals to the other terminal via the content sharing server 1010. As a result, the content of the operation executed on the content 1031 in one of the terminals is reflected upon the content 1031 stored in the other terminal.

With the content sharing system 1001, it is possible to execute the above-described operations while exchanging voice conversations between the terminals 1020a and 1020b. The content sharing system 1001 is an example of a multimedia communication service in which the voice call and data communication are merged by using IMS (Internet protocol Multimedia Subsystem), and it can be applied to the use of video conferences, voice chats, and the like. Currently, the technical developments that can be utilized for such multimedia communication services are actively done.

As technical documents related to that, there are following techniques. Among those, depicted in Patent Document 1 is an SIP tunneling device which mutually switches the communication protocols between SIP (Session Initiation Protocol) and "own protocol". Depicted in Patent Document 2 is a protocol switching device which switches data communicated with an application with HTTP (Hyper Text Transfer Protocol) to SIP according to "proper condition" of the type of the data and the like when a data acquiring unit relays the data.

Depicted in Patent Document 3 is an SIP application server and the like, which switch the protocol to be used based on the priority order determined in advance so as to be able to provide a service to a terminal that is not compatible with a specific communication method. Depicted in Patent Document 4 is a protocol switching device which switches communication data of SIP to be able to be used in a terminal device that employs HTTP. Depicted in Non-Patent Document 1 is the outline of an existing technique regarding IMS.

Patent Document 1: Japanese Unexamined Patent Publication 2002-247130
Patent Document 2: Japanese Unexamined Patent Publication 2010-050617
Patent Document 3: Japanese Unexamined Patent Publication 2010-056632
Patent Document 4: JP No. 4273899
Non-Patent Document 1: Nakazawa et. al., "Terminal Application Platform for Achieving IMS Service" OKI Technical Review No. 210, April, 2007 OKI Electric Industry Co., Ltd.

The communication protocols used in general in the content sharing system 1001 shown in FIG. 19 are mainly two kinds of protocols called HTTP (Hypertext Transfer Protocol) and SIP (Session Initiation Protocol). HTTP is the communication protocol used most frequently in transferring contents on websites on a network, and it is used in many cases also in the content sharing system. This is because the consumption of server resources (server resources such as remaining amount of a memory) of the content sharing server 1010 is small since it is unnecessary to establish a session (connection) between the terminals 1020a and 1020b which are communicating with each other.

However, with HTTP, data cannot be directly transmitted from the terminal 1020a as one of the terminals to the other terminal 1020b (push-type communication). Thus, each of the terminals 1020a and 1020b is required to connect to the content sharing server 1010 regularly to check if there is any communication directed for the terminal itself. This is called "polling". Since it is necessary to perform polling regularly, each of the terminals 1020a and 1020b consumes the power constantly even when no data communication is being executed.

In the meantime, SIP is the communication protocol used frequently for video conferences, Internet telephones, and the like. With SIP, data can be transmitted directly from the terminals 1020a as one of the terminals to the other terminal 1020b by using the push-type communication such as MSRP (Message Session Relay Protocol), so that it is unnecessary to perform regular polling.

Therefore, the power consumption of each of the terminals 1020a and 1020b can be made smaller with the use of SIP than the case of using HTTP. Meanwhile, it is necessary to establish a session between each of the terminals 1020a and 1020b within the content sharing server 1010, so that a great amount of server resource is consumed.

It is by all means necessary to suppress the power consumption of each of the terminals 1020a and 1020b in the above-described content sharing system 1001 to be low and to suppress the consumption of the server resource of the content sharing server 1010 as much as possible so that a greater number of terminals can be participated in the communication. In that sense, SIP and HTTP are in a trade-off relationship with which it is difficult to achieve the both in terms of the power consumption of the terminals and the consumption of the server resource of the content sharing server.

However, Patent Documents 1 to 4 and Non-Patent Document 1 described above do not disclose a technique which makes it possible to reduce both the power consumption of the terminals and the consumption of the server resource in the content sharing server. The techniques depicted in Patent Documents 1 to 2 and Patent Document 4 are related to "change" of the protocol but not related to "switching" of protocols, so that it is not possible to suppress the power consumption and the consumption of the server resource by switching the communication protocols.

Patent Document 3 discloses "switching" of the protocols. However, this technique switches the protocols according to "priority" but does not switch the protocol according to the frequency of generating the incremental update command. Further, this technique does not suppress the power consumption.

The object of the present invention is to provide a content sharing system, a mobile terminal, a protocol switching method, and a program thereof, which are capable of reducing the power consumption in the terminals and to effectively utilize the server resource.

DISCLOSURE OF THE INVENTION

In order to achieve the foregoing object, the content sharing system according to the present invention is a content sharing system constituted by mutually connecting a plurality of terminal devices capable of mutually performing a voice call and data communication, switching equipment which mediates the voice call between each of the terminal devices, and a content sharing server which mediates the data communication between each of the terminal devices, wherein each of the terminal devices is characterized to include: a voice call module which performs the voice call; a content sharing application which generates an incremental update command in response to a user operation done by one of the terminal devices made on a same content stored inside the both terminals for reflecting a content of the operation upon the same content in the other terminal device, and transmits it to the other terminal device; a first and a second communication control units which perform the data communication with either one of a first and a second communication protocols; and a protocol selection unit which selects either one of the first and second communication protocols according to states of each of the terminal devices, transmits it to the content sharing server as a desired protocol, and employs a determined protocol received from the content sharing server as the communication protocol.

In order to achieve the foregoing object, the mobile terminal according to the present invention is a terminal device which is capable of performing a voice call and data communication and constitutes a content sharing system by being mutually connected to switching equipment which mediates the voice call with other devices and to a content sharing server which mediates the data communication with the other devices, and the terminal device is characterized to include: a voice call module which performs the voice call; a content sharing application which generates an incremental update command in response to a user operation done by one of the terminal devices made on a same content stored inside for reflecting a content of the operation upon the same content in the other terminal device, and transmits it to the other terminal device; a first and a second communication control units which perform the data communication with either one of a first and a second communication protocols; and a protocol selection unit which selects either one of the first and second communication protocols according to a state of itself, transmits it to the content sharing server as a desired protocol, and employs a determined protocol received from the content sharing server as the communication protocol.

In order to achieve the foregoing object, the protocol switching method according to the present invention is a protocol switching method used in a content sharing system constituted by mutually connecting a plurality of terminal devices capable of mutually performing a voice call and data communication, switching equipment, and a content sharing server, and the method is characterized that: a same content is stored inside the both terminal devices in advance; the switching equipment mediates the voice call between the terminal devices; the content sharing server mediates the data communication between each of the terminal devices; a content sharing application in one of the terminal devices generates an incremental update command in response to a user operation done by one of the terminal devices made on the content for reflecting a content of the operation upon the same content in the other terminal device, and transmits it to the other terminal device; a protocol selection unit of one of the terminal devices selects either one of the first and second communication protocols for performing the data communication according to the state of the terminal device, and transmits it to the content sharing server as a desired protocol; a protocol determining unit of the content sharing server determines a determined protocol from the desired protocols received from all the terminal devices, and transmits it to all the terminal devices; and the protocol selection unit in all the terminal devices receives the determined protocol from the content sharing server, and employs the determined protocol as the communication protocol.

In order to achieve the foregoing object, the protocol switching program according to the present invention is a protocol switching program used in a content sharing system constituted by mutually connecting a plurality of terminal devices capable of mutually performing a voice call and data communication, switching equipment, and a content sharing server, and the program is characterized to cause a computer provided to each of the terminal devices to execute: a procedure for storing a content same as a content of another terminal device in advance; a procedure for generating an incremental update command in response to a user operation made on the content for reflecting upon the same content in the other terminal device, and transmitting it to the other terminal device; a procedure for selecting either one of the first and second communication protocols according to a state of the terminal device to perform the data communication, and transmitting it to the content sharing server as a desired protocol; and a procedure for receiving a determined protocol from the content sharing sever, and employing the determined protocol as the communication protocol.

As described above, the present invention is structured to select one of the first and second communication protocols to perform data communication in accordance with the state of the terminal devices and to perform the communication with that protocol. Thus, it is possible to select the optimum protocol in accordance with the state of the communication and the like. Thereby, it is possible to provide the excellent content sharing system, mobile terminal, protocol switching method, and program thereof, which are capable of reducing the power consumption in the terminals and to effectively utilize the server resource.

BRIEF DESCRIPTION OF THE DRAWINGS

FIG. 3 is an explanatory chart showing an example of a content of protocol selection data shown in FIG. 2;

FIGS. 5A and 5B show explanatory charts regarding a more detailed structure of the content sharing server and switching equipment shown in FIG. 2, in which FIG. 5A shows the content sharing server and FIG. 5B shows the switching equipment, respectively;

FIGS. 13A and 13B show explanatory charts of the structures of a notebook PC and a telephone shown in FIG. 11, in which FIG. 13A shows the notebook PC and FIG. 13B shows the telephone, respectively;

BEST MODES FOR CARRYING OUT THE INVENTION

First Exemplary Embodiment

Figure 1:
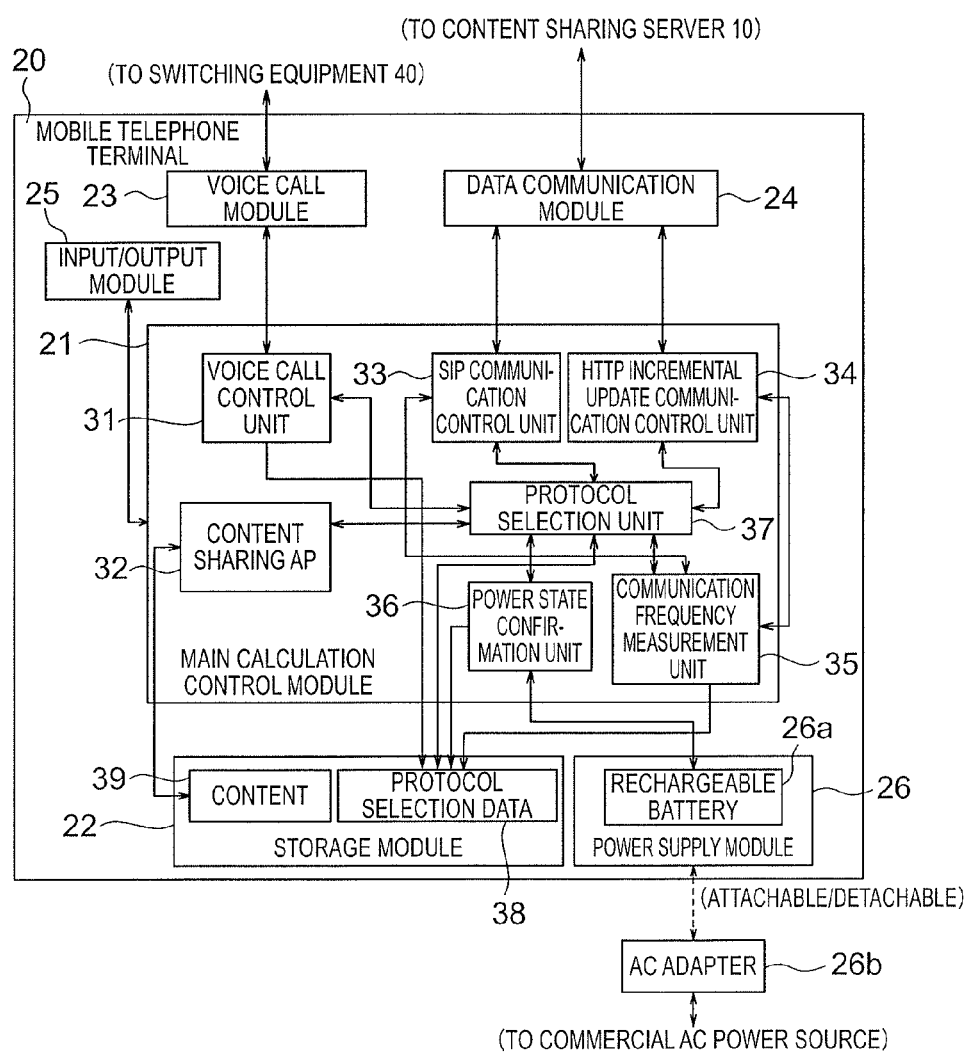
FIG. 1 is an explanatory chart showing a more detailed structure of a mobile telephone terminal shown in FIG. 2.

Hereinafter, the structure of the first exemplary embodiment of the present invention will be described by referring to the accompanying drawings 1, 2, and 5.

The basic contents of the exemplary embodiment will be described first, and more specific contents thereof will be described thereafter.

A content sharing system 1 according to the exemplary embodiment is a content sharing system which is constituted by mutually connecting a plurality of terminal devices 20 that are capable of mutually performing a voice call and data communication, switching equipment 40 which mediates the voice calls between the terminal devices, and a content sharing server 10 which mediates the data communication between the terminals devices. Each of the terminal devices (mobile telephone terminals 20) includes: a voice call module 23 for performing voice calls; a content sharing application (sharing AP32) which generates an incremental update command for reflecting an operation content according to the operation of a user made in one of the terminal devices on a same content stored inside the both upon the same content on the other terminal device, and transmits it to the other terminal device; a first and a second communication control units (an SIP communication control unit 33, an HTTP incremental update communication control unit 34) which perform data communication with either one of a first and a second communication protocols; and a protocol selection unit 37 which selects either one of the first and second communication protocols in accordance with the state of each terminal device, transmits it to the content sharing server as a desired protocol, and employs the determined protocol received from the content sharing server as the communication protocol.

Note here that the protocol selection unit 37 of the terminal device (mobile telephone terminal 20) detects that a voice call is started or ended, and selects either one of the first and second communication protocols. More specifically, the protocol selection unit 37 selects the first communication protocol when the voice call is started, and selects the second protocol when the voice call is ended.

Further, the protocol selection unit 37 of the terminal device (mobile telephone terminal 20) detects the frequency of the incremental update command transmission by the content sharing application (sharing AP32), and selects either one of the first and second communication protocols. More specifically, the protocol selection unit 37 selects the first communication protocol when the frequency of the incremental update command transmission is higher than a threshold value given in advance, and selects the second protocol when the frequency of the incremental update command transmission is lower than the threshold value.

Further, the protocol selection unit 37 of the terminal device (mobile telephone terminal 20) detects the remaining amount of a battery (rechargeable battery 26a) inside a power source device (power supply module 26) provided to itself, and selects either one of the first and second communication protocols. More specifically, the protocol selection unit 37 selects the first communication protocol when the remaining amount of the battery is lower than a threshold value given in advance, and selects the second protocol when the remaining amount is higher than the threshold value or the terminal device is connected to a commercial power source (AC adapter 26b).

The content sharing server 10 on the other hand includes: a first and a second communication mediating units (SIP communication mediating unit 51, HTTP communication mediating unit 52) which mediate the data communication between the terminal devices by the first and the second communication protocols; and a protocol determining unit 53 which receives the desired protocol from the terminal devices, determines the determined protocol from the desired protocols of each of all the terminal devices, and transmits it to each of all the terminal devices. Note here that the first and the second communication protocols are SIP (Session Initiation Protocol) and HTTP (Hypertext Transfer Protocol), respectively.

Through providing such structure, the content sharing system 1 can switch the communication protocols in accordance with the state of the terminal devices (mobile telephone terminals 20). This makes it possible to reduce the power consumption of the terminals and to suppress the consumption of the server resource to be small.

Hereinafter, this will be described in more details.

Figure 2:
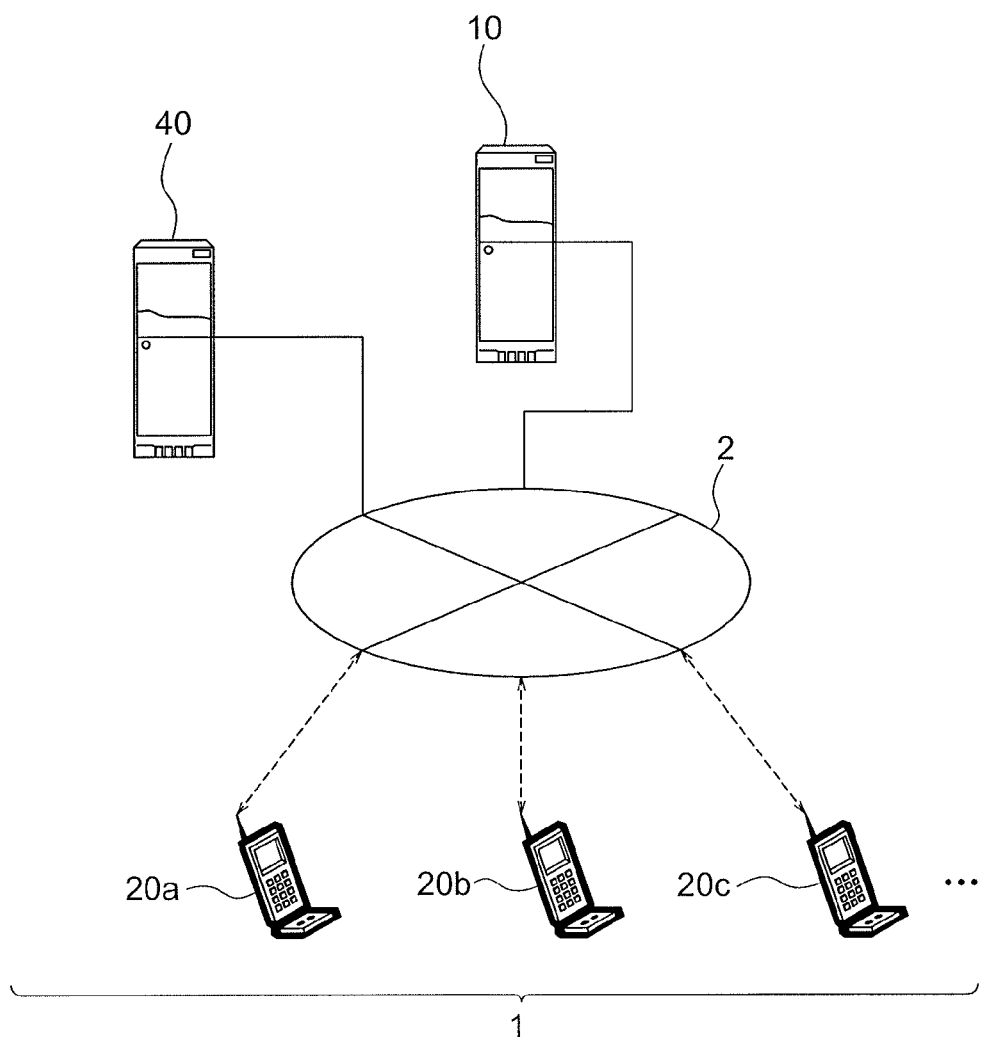
FIG. 2 is an explanatory chart showing the structure of a content sharing system according to a first exemplary embodiment of the present invention.

FIG. 2 is an explanatory chart showing the structure of the content sharing system 1 according to the first exemplary embodiment of the present invention. The content sharing system 1 is so structured that each of a plurality of mobile telephone terminals 20a, 20b, 20c, - - - can be connected to the switching equipment 40 for the voice call and the content sharing server 10 for the data communication via a public communication net 2 including radio communications. There may be any number of mobile telephone terminals. However, in order to simplify the explanation, two mobile telephone terminals 20a and 20b are focused herein.

Needless to say, it is also possible to replace each of the mobile telephone terminals 20a, 20b, 20c, - - - with other types of terminals (e.g., smartphone terminals, personal computer terminals) than the mobile telephone terminals. Also, there may be a mixture of different types of terminals.

The mobile telephone terminals 20a and 20b can share the operations made on the contents such as web pages, photographs, music, videos, word-processed documents, and spreadsheets via the content sharing server 10 while performing a voice call via the switching equipment 40.

A same content is saved in the mobile telephone terminals 20a and 20b, respectively. When the operator of the mobile telephone terminal 20a performs some kind of operation on the content, the operation content is also transmitted to the mobile telephone terminal 20b as an incremental update command so that the operation content is also reflected upon the same content on the mobile telephone terminal 20b side. The same operation on the content can be also done from the mobile telephone terminals 20b side.

The content sharing server 10 has both a function as an SIP server and a function as an HTTP server. Thus, the mobile telephone terminal 20a or 20b and the content sharing server 10 can be connected with any of the two kinds of protocols SIP and HTTP.

When a content of an operation made on the content is relayed from one of the mobile telephone terminals to the other in a case of connection using SIP, it is possible to use MSRP that is a push-type protocol with which the data can be transmitted to the other mobile telephone terminal.

However, in a case of connection using HTTP, the data cannot be transmitted to the other since HTTP is not a push-type protocol. Therefore, it is necessary to make an inquiry from the terminal to the server at a preset interval of about several seconds to several minutes to check whether or not operation data to be transmitted to the terminal exists in the server. Such communication is called "polling".

Any methods can be used for voice calls between the mobile telephone terminals 20a and 20b. For example, calls may be done with a line connection type which does not use data communication or may be Voip (Voice Over Internet Protocol) which uses SIP.

(Structure and Action of Mobile Telephone Terminal)

FIG. 1 is an explanatory chart showing a more detailed structure of the mobile telephone terminals 20a and 20b shown in FIG. 2. The mobile telephone terminals 20a, 20b, 20c and thereafter all have the same structure, so that those terminals are referred to as "mobile telephone terminal 20" as a general term. The mobile telephone terminal 20 includes the basic structure as a computer and the structure required for making voice calls.

That is, the mobile telephone terminal 20 includes: a main calculation control module (CPU: Central Processing Unit) 21 as the main body which executes computer programs; a storage module 22 which stores data; a voice call module 23 which performs a voice call with other mobile telephone terminals; a data communication module 24 which performs data communication with other mobile telephone terminals; an input/output module 25 which accepts operations from the user, and presents processing results to the user; and a power supply module 26 which supplies necessary powers to each of the above-described units.

The power supply module 26 includes a battery 26a inside thereof. Further, an AC adapter 26b for converting a commercial alternating current power source to a direct current with which the mobile telephone terminal 20 can be operated is provided thereto in a detachable manner. While the AC adapter 26b is being connected to the power supply module 26, the mobile telephone terminal 20 is operated by the direct current supplied from the AC adapter 26b. At the same time, the battery 26a is charged also by the direct current.

In the main calculation control module 21, a voice call control unit 31, the content sharing application 32, an SIP communication control unit 33, an HTTP incremental update communication control unit 34, a communication frequency measurement unit 35, a power state confirmation unit 36, and the protocol selection unit 37 are so structured to have the respective functions to be described later executed as respective computer programs. Further, protocol selection data 38 as data showing the state of communication currently done by the mobile telephone terminals 20 and a content 39 as the target shared by the mobile telephone terminals 20a and 20b are stored in the storage module 22. The details thereof will also be described later.

The voice call control unit 31 controls the voice call module 23 to execute the action for the voice call between each of the mobile telephone terminals 20 via the switching equipment 40. Further, the voice call control unit 31 includes a function which acquires call session information from the voice call module 23 or the content sharing server 10, and records it to the protocol selection data 38 as a call state 38a to be described later.

The content sharing application 32 (referred to as sharing AP 32 hereinafter) is an application for sharing the contents 39 such as web pages, photographs, music, videos, word-processed documents, and spreadsheets among a plurality of terminals in a real-time manner. The content 39 is stored in advance at least in one of the mobile telephone terminals 20a and 20b. When the same content 39 is not stored in the other terminal, the content is transmitted thereto at the time of starting an operation. That is, it is a presupposition of the actions of the present invention that the same content 39 is stored in both of the mobile telephone terminals 20a and 20b.

"Realtime" herein means not only to transmit the content 39 from one of the mobile telephone terminals 20a and 20b to the other to store it in the both but also to continue the voice call and data communication between the mobile telephone terminals 20a and 20b after the transmission and the operation done on the content 39 by one of the users is reflected immediately upon the content 39 on the other mobile telephone terminal 20.

More specifically, the operations done on the contents 39 by the user (via the input/output module 25) in a case where the contents 39 are still pictures are writing of characters as well as writing of drawing data, change of the screen size, shift of the display positions, turning of pages, and the executed thereon. In a case where the contents 39 are videos, the operations are playback, stop, rewinding, and the like executed thereon.

Further, when the contents 39 are web pages, the operations are change of URL, scrolling, writing to text boxes, pressing of buttons, and the like executed thereon. In a case where the contents 39 are word-processed texts or spreadsheets, the operations are editing of sentences, graphs, and the like, adding comments, shift of the screen display, shift of a cursor, and the like executed thereon.

The sharing AP32 generates an incremental update command according to the operation content done by the user and sends it to the protocol selection unit 37 in order to transmit the operation content to the other terminal via the content sharing server 10 through the continuing communication. Further, the sharing AP32 receives the incremental update command from the other terminal via the protocol selection unit 37, and reflects the content on the screen of the sharing AP32 displayed on the input/output module 25. Further, during the voice call, the sharing AP32 determines the counter terminal in association with the voice call control unit 31 for sharing the content 39 with the partner of the voice call.

Note here that the incremental update command is generated by the operation of the user done via the input/output module 25, so that the timing at which the incremental update command is generated is irregular. There is such a characteristic that incremental update commands are generated continuously when the user is absorbed in writing operations on the content 39, for example, but the frequency of generation thereof is deteriorated when the user is gazing the screen intently.

The SIP communication control unit 33 transmits the incremental update command given to the protocol selection unit 37 to the content sharing server 10 via the data communication module 24 by using a push-type protocol such as MSRP (Message Session Relay Protocol). Inversely, the SIP communication control module 33 gives the incremental update command sent from the content sharing server 10 (via the data communication module 24) by using the push-type protocol to the protocol selection unit 37.

The SIP communication control unit 33 connects the same terminal as that of the voice call via the content sharing server 10 as the communication partner. By using MSRP, the incremental update command can be transmitted to the partner terminal immediately. This provides advantages of having a high immediacy and having low power consumption when the frequency of data transmission/reception is small. Note, however, that the mobile telephone terminals 20a and 20b which have communication are required to establish a session mutually prior to the communication. Thus, a great amount of server resource of the content sharing server 10 is consumed.

The HTTP incremental update communication control unit 34 transmits the incremental update command given to the protocol selection unit 37 to the content sharing server 10 via the data communication module 24 by using the HTTP polling protocol. Inversely, the HTTP incremental update communication control unit 34 gives the incremental update command sent from the content sharing server 10 (via the data communication module 24) at the timing of the HTTP polling to the protocol selection unit 37.

The HTTP incremental update communication control unit 34 connects the same terminal as that of the voice call as the communication partner via the content sharing server 10. The use of HTTP makes it possible to perform the communication with a best effort without consuming the resource of the SIP server. This provides advantages of suppressing the communication cost to be low and allowing the use thereof by the terminals that have no SIP function. In the meantime, data communication is generated regularly for polling actions. Therefore, the power is consumed steadily.

The communication frequency measurement unit 35 acquires the information on whether the number of the incremental update commands transmitted by the mobile telephone terminals 20 within a specific time is "higher" or "lower" than a prescribed threshold value from the sharing AP32, and records it to the protocol selecting data 38 to be described later as an update frequency 38d to be described later.

The power state confirmation unit 36 acquires the information on whether the remaining amount of the rechargeable battery 26a inside the power supply module 26 is "higher" or "lower" than a prescribed threshold value and whether the AC adapter 26b is "connected" or "not connected" to the mobile telephone terminal 20, and records those to the protocol selection data 38 to be described later as a battery remaining amount 38b and a charger connection 38c to be described later.

The protocol selection unit 37 determines the communication protocol to be used for the communication with the counter terminal, and gives the incremental update command transmitted from the sharing AP32 to either the SIP communication control unit 33 or the HTTP incremental update communication control unit 34 according to the protocol. Inversely, the protocol selection unit 37 gives the incremental update command sent from the SIP communication control unit 33 or the HTTP incremental update communication control unit 34 to the sharing AP 32.

The protocol selection unit 37 uses the information stored in the protocol selection data 38 in order to determine the communication protocol to be used. FIG. 3 is an explanatory chart showing an example of the content of the protocol selection data 38 shown in FIG. 2. The protocol selection data 38 includes each data of the call state 38a, the battery remaining amount 38b, the charger connection 38c, the update frequency 38d, and a desired protocol 38e.

The call state 38a is binary data showing whether the state of the voice call is "calling" or "standby", and it is judged by the voice call control unit 31 from the call session information acquired from the voice call module 23 and recorded to the protocol selection data 38.

The battery remaining amount 38b is binary data showing whether the remaining amount of the rechargeable battery 26a inside the power supply module 26 is "higher" or "lower" than a prescribed threshold value, and it is acquired by the power state confirmation unit 36 from the power supply module 26 and recorded to the protocol selection data 38.

The charger connection 38c is binary data showing whether the AC adapter 26b is "connected" or "not connected" to the mobile telephone terminal 20, and it is acquired by the power state confirmation unit 36 from the power supply module 26 and recorded to the protocol selection data 38. When the charger connection 38c shows the state of "connected", the battery remaining amount 38b automatically comes in a state of "higher".

The update frequency 38d is binary data showing whether the number of the incremental update commands transmitted by the mobile telephone terminal 20 within a specific time is "higher" or "lower" than a prescribed threshold value, and it is acquired by the communication frequency measurement unit 35 from the sharing AP 32 and recorded to the protocol selection data 38. Further, the desired protocol 38e is a communication protocol determined by the protocol selection unit 37 for each of the mobile telephone terminals 20 from each piece of the information of the communication state 38a, the battery remaining amount 38b, the charger connection 38c, and the update frequency 38d, and it is either SIP or HTTP.

The protocol selection unit 37 selects "HTTP" as the desired protocol 38e when the call state 38a shows "standby". When the communication state 38a shows "calling", any of the protocols "SIP" and "HTTP" may be selected as the desired protocol 38e.

The protocol selection unit 37 selects either "SIP" or "HTTP" according to the initial setting of the user for the desired protocol 38e in the initial state immediately after the call is started. Further, the protocol selection unit 37 is capable of switching the communication protocols during the call according to the battery remaining amount 38b and the update frequency 38d. When the battery remaining amount 38b is "lower" or the update frequency 38d is "higher", the desired protocol is determined as "SIP". In other cases, i.e., when the battery remaining amount 38b is "higher" and the update frequency 38d is "lower", the desired protocol is determined as "HTTP".

The desired protocol 38e determined for each of the mobile telephone terminals 20 is sent to the content sharing server 10 by using the communication protocol used currently. Then, the protocol selection unit 37 receives the determined protocol that is the communication protocol determined on the content sharing server 10 side, decides it as the finally employed communication protocol, and performs communication with the protocol.

That is, each of the mobile telephone terminals 20 performing the communication receives the same determined protocol determined by the content sharing server 10, selects the same protocol thereby, and performs the communication. There is no specific structure for switching the protocol on the communication path, so that each of the mobile telephone terminals 20 communicating with each other is necessarily required to select the same protocol simultaneously.

Figure 4:
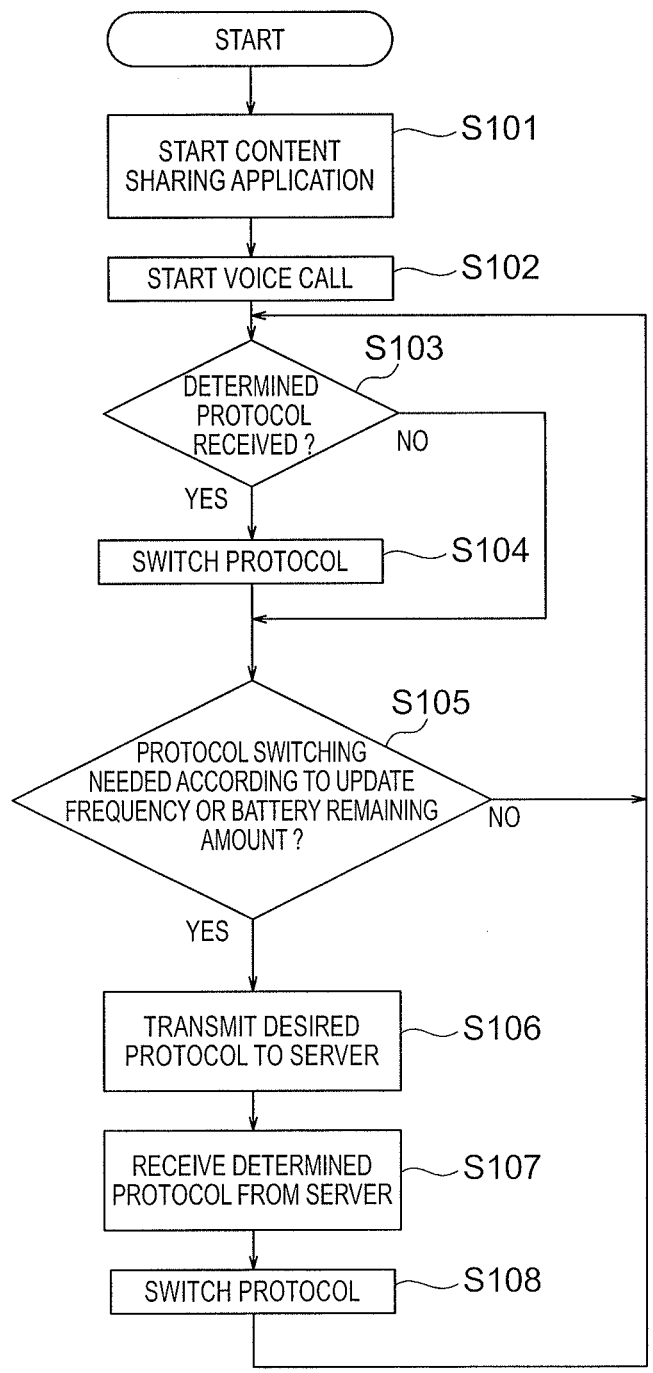
FIG. 4 is a flowchart showing actions at the time of sharing a content in the mobile telephone terminals shown in FIG. 1 to FIG. 2.

FIG. 4 is a flowchart showing actions of the mobile telephone terminal 20 shown in FIG. 1 to FIG. 2 at the time of sharing the content. First, the sharing AP 32 starts up to establish the communication between the mobile telephone terminals 20a and 20b (step S101), the content 39 is transmitted from one of the mobile telephone terminals 20 to the other mobile telephone terminal 20 so that the same content 39 is stored in the both terminals.

Then, the voice call control unit 31 starts a voice call between the mobile telephone terminals 20a and 20b (step S102). Thereby, the mobile telephone terminals 20a and 20b can share and operate on the content 39 mutually.

Note here that when the determined protocol is received from the content sharing server 10 (Yes in step S103), the protocol selection unit 37 switches the communication protocol according to that (step S104). When the determined protocol is not received (No in step S103), the processing is advanced to step S105.

Then, the protocol selection unit 37 monitors each data of the call state 38a, the battery remaining amount 38b, the charger connection 38c, and the update frequency 38d of the protocol selection data 38, and judges whether or not switching of the communication protocol is required (step S105). More specifically, when the battery remaining amount 38b is "lower" or the update frequency 38d is "higher", the desired protocol 38e is "SIP". In other cases, i.e., when the battery remaining amount 38b is "higher" and the update frequency 38d is "lower", the desired protocol 38e is "HTTP". When the desired protocol 38e determined with this selection criteria is different from the communication protocol used for the current communication, it means that it is necessary to switch the communication protocol.

When it is necessary to switch the communication protocol (Yes in step S105), it is stored to the protocol selection data 38, and the desired protocol 38e is transmitted to the other mobile telephone terminal 20 via the content sharing server 10 (step S106). Then, after checking that the determined protocol is received from the content sharing server 10 (i.e., the determined protocol is transmitted also to the partner terminal) (step S107), the determined protocol is employed as the communication protocol used for the own communication (step S108). Thereafter, actions of the steps S103 to 108 are repeated.

(Structures and Actions of Content Sharing Server and Switching Equipment)

Figure 5A:
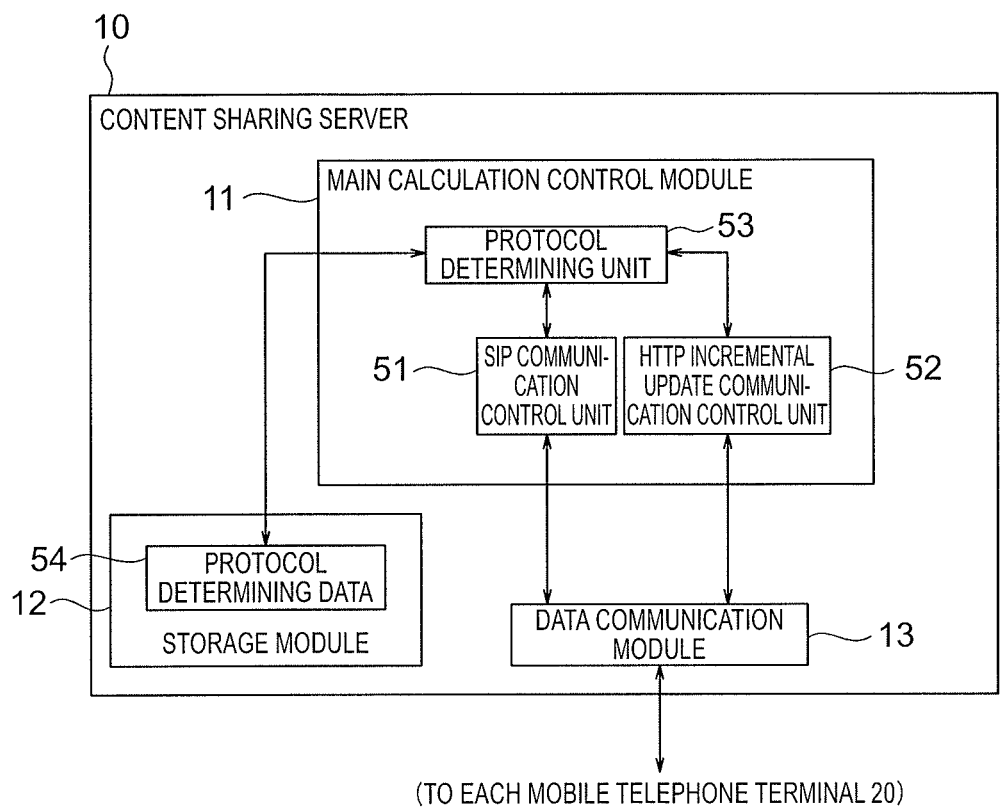
Figure 5B:
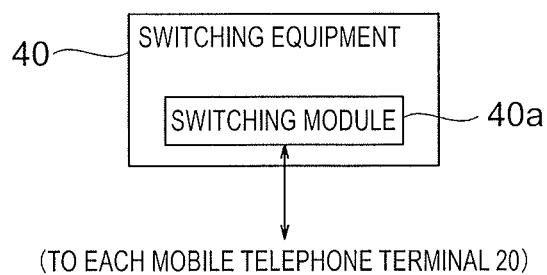

FIG. 5 is an explanatory chart showing more detailed structures of the content sharing server 10 and the switching equipment 40 shown in FIG. 2. FIG. 5A shows the content sharing server 10, and FIG. 5B shows the switching equipment 40, respectively. The content sharing server 10 shown in FIG. 5A has the basic structure as a computer. That is, the content sharing server 10 includes: the main calculation control module (CPU: Central Processing Unit) 11 as the main body for executing computer programs; the storage module 12 which stores the data; and the data communication module 13 which performs the data communication with other mobile telephone terminals.

In the main calculation control module 11, an SIP communication mediating unit 51 which mediates the communication between each of the mobile telephone terminals 20 by using SIP via the data communication module 13, an HTTP communication mediating unit 52 which mediates the communication between each of the mobile telephone terminals 20 by using HTTP via the data communication module 13, and a protocol determining unit 53 that determines which of the protocols SIP and HTTP is to be selected for performing the communication with each of the mobile telephone terminals 20 are structured to have respective functions executed as each of the computer programs. Further, protocol determining data 54 that is the data showing the state of communication currently done by each of the mobile telephone terminals 20 is stored in the storage module 12.

The SIP communication mediating unit 51 and the HTTP communication mediating unit 52 relay the communication data (incremental update command and the like) sent from one of the mobile telephone terminals 20 to the other mobile telephone terminal 20 by each of the communication protocols. The protocol determining unit 53 receives the desired protocols 38e from each of the mobile telephone terminals 20 which are currently communicating with each other, and stores those as the protocol determining data 54. Then, the protocol determining unit 53 determines the protocol that is actually used for the communication, informs it to the mobile telephone terminals 20 as the determined protocol, and stores it to the protocol determining data 54.

The switching equipment 40 shown in FIG. 5B includes a switching module 40a which exchanges and mediates the voice calls between the mobile telephone terminals 20. In the exemplary embodiment, it is not specifically necessary for the switching module 40a to operate in association with the content sharing server 10.

Figure 6:
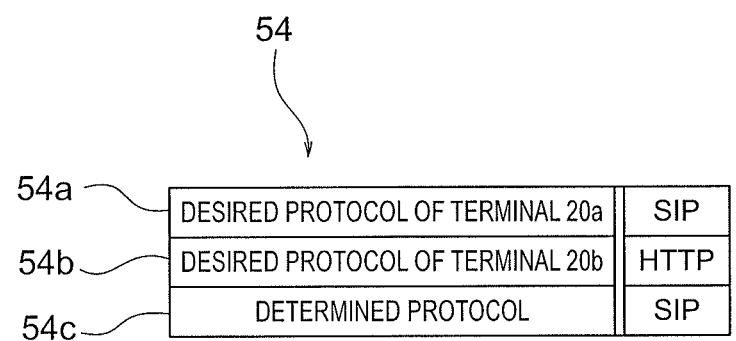
FIG. 6 is an explanatory chart showing an example of a content of protocol determining data shown in FIG. 5A.

FIG. 6 is an explanatory chart showing an example of the content of the protocol determining data 54 shown in FIG. 5A. In the example shown in FIG. 6, shown is the state where the mobile telephone terminals 20a and 20b shown in FIG. 1 are currently communicating with each other. In this case, the protocol determining data 54 contains a desired protocol 54a of the mobile telephone terminal 20a, a desired protocol 54b of the mobile telephone terminal 20b, and a determined protocol 54c determined by the protocol determining unit 53 based thereupon.

Figure 7:
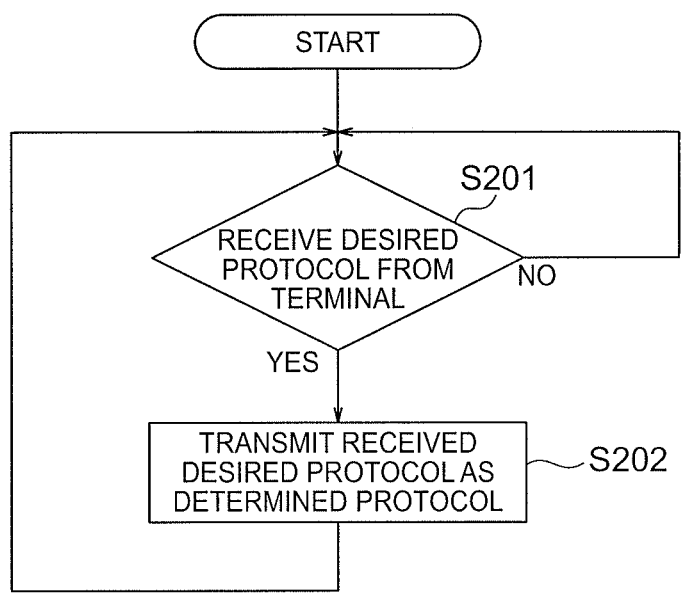
FIG. 7 is a flowchart showing actions of a protocol determining unit shown in FIG. 5A.

FIG. 7 is a flowchart showing actions of the protocol determining unit 53 shown in FIG. 5A. When receiving the desired protocol 38e from one of the mobile telephone terminals 20 that are currently communicating with each other (Yes in step S201), the protocol determining unit 53 transmits it to the mobile telephone terminal 20 and the target mobile telephone terminal 20 communicating with that terminal as the determined protocol 54c (step S202). At the same time, the protocol determining unit 53 stores the desired protocol 54a or 54b as well as the determined protocol 54c also to the protocol determining data 54.

In this example, when one of the mobile telephone terminals 20 transmits the desired protocol 38e, it automatically turns out as the determined protocol 54c and is transmitted to the other mobile telephone terminal 20. A case where three or more mobile telephone terminals 20 share the same content 39 while simultaneously performing voice calls will be described later.

(Actions for Switching Protocol)

Figure 8:
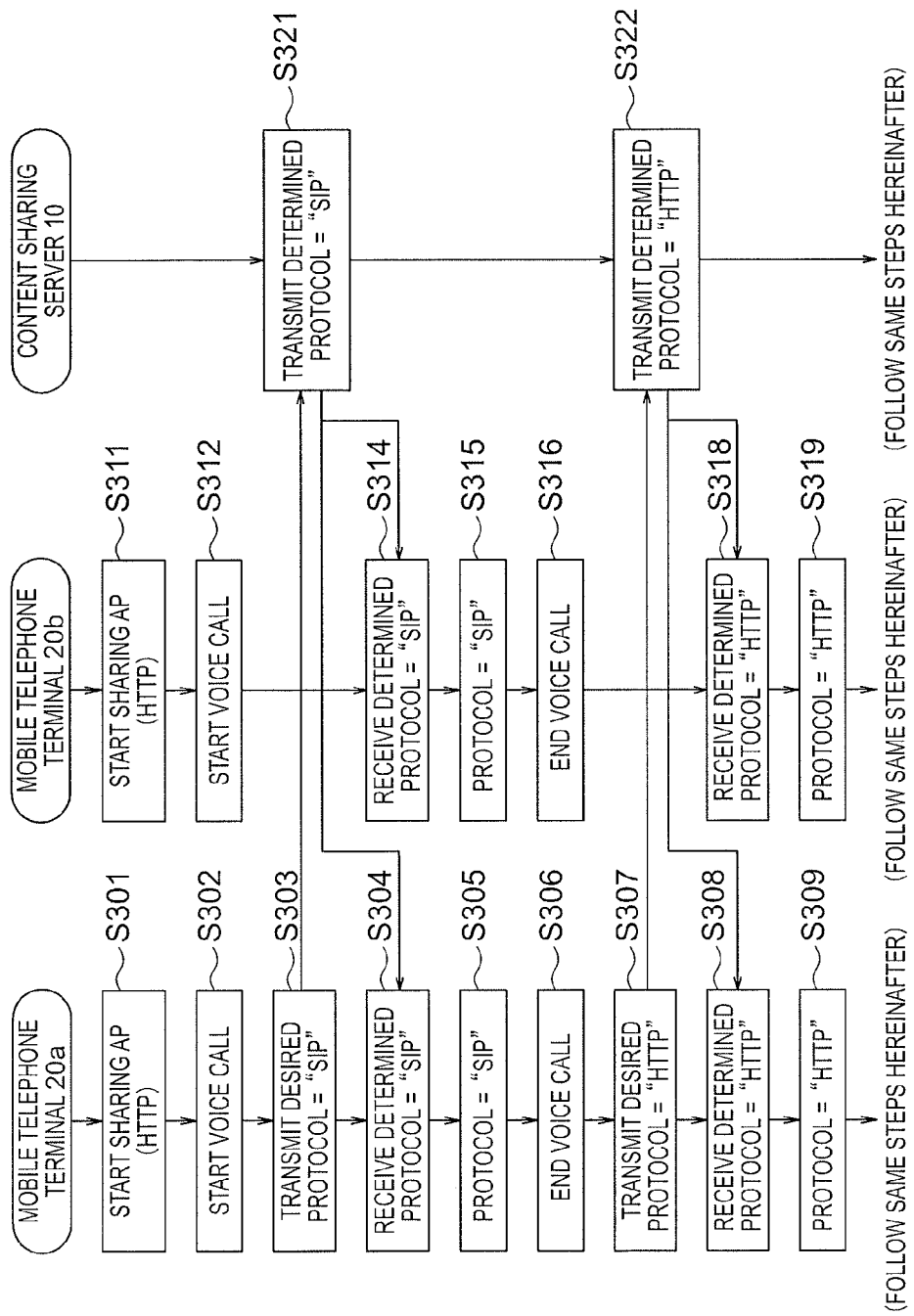
FIG. 8 is an explanatory chart showing an example of actions of protocol switching in association with a voice call in a case where mobile telephone terminals share a same content in the content sharing system shown in FIG. 1.

FIG. 8 is an explanatory chart showing an example of operations of protocol switching in association with a voice call in a case where the mobile telephone terminals 20a and 20b share a same content 39 in the content sharing system 1 shown in FIG. 1. First, the mobile telephone terminal 20a as one of the terminals starts up the sharing AP32 to be in a standby state (step S301, corresponds to step S101 of FIG. 4). In parallel to that, the mobile telephone terminal 20b as the other terminal starts up the sharing AP32 to be in a standby state (step S311, corresponds to step S101 of FIG. 4).

In a case where the content 39 as the sharing target exists only in one of the mobile telephone terminals 20a and 20b and the same content 39 does not exist in the other terminal, the content 39 is transmitted from one to the other so that the same contents 39 are stored in the both terminals. This is an action that may be executed at any timing during the steps of FIG. 8 as long as it is during the state where the sharing AP32 is in operation, so that it is possible to execute that action regardless of the changes in the state of the voice call and the like. Thus, this action is not illustrated in FIG. 8. This is the same in FIG. 9 and FIG. 10 to be described later.

No voice call is performed in steps S301 and 311, so that the call state 38a shows "standby" and the protocol to be selected is "HTTP". Note here that the initial values of the desired protocols 54a, 54b of the both terminals and the determined protocol 54c registered as the protocol determining data 54 in the content sharing server 10 are "HTTP".

The voice call control unit 31 in the mobile telephone terminal 20a as one of the terminals tries to call the other mobile telephone terminal 20b to start a voice call (step S302, corresponds to step S102 of FIG. 4). When the other mobile telephone terminal 20b responds to the call, the voice call is started (step S312, corresponds to step S102 of FIG. 4).

Note here that when the desired protocol 38e="SIP" is set as the initial state at the time of starting the call in the sharing AP32, the currently selected communication protocol "HTTP" is different from the desired protocol 38e. Thus, it is judged that step S105 of FIG. 4 is Yes in the mobile telephone terminal 20a as one of the terminals, i.e., it is judged that "switching of the communication protocol is necessary". This judgment may also be done on the mobile telephone terminal 20b side.

Therefore, the desired protocol 38e="SIP" is transmitted from the one mobile telephone terminal 20a to the content sharing server 10 (step S303, corresponds to step S106 of FIG. 4). The content sharing server 10 upon receiving that transmits the desired protocol 38e (54a)="SIP" of the mobile telephone terminal 20a to both of the mobile telephone terminals 20a and 20b as the determined protocol 54c (step S321, corresponds to step S202 of FIG. 7).

The mobile telephone terminal 20a upon receiving the determined protocol 54c="SIP" (step S304, corresponds to step S107 of FIG. 4) switches the communication protocol to "SIP" in response to that (step S305, corresponds to step S108 of FIG. 4). Further, the mobile telephone terminal 20b upon receiving the determined protocol 54c="SIP" (step S314, corresponds to step S103 of FIG. 4) also switches the communication protocol to "SIP" in response to that (step S315, corresponds to step S104 of FIG. 4).

When the voice call is ended between the mobile telephone terminals 20a and 20b (steps S306 and 316), the communication state 38e is returned to "standby" in both of the terminals. Thus, the protocol "SIP" of the currently executed communication is different from the desired protocol 38e, so that it is judged as Yes in step S105 of FIG. 4 in the one mobile telephone terminal 20a, i.e., judged that "it is necessary to switch to the communication protocol (to HTTP)".

Therefore, the desired protocol 38e="HTTP" is transmitted to the content sharing server 10 from both of the mobile telephone terminals 20a and 20b (steps S307 and 317). The content sharing server 10 upon receiving that transmits the desired protocol 38e (54a and 54d)="HTTP" of the mobile telephone terminal 20a to both of the mobile telephone terminals 20a and 20b as the determined protocol 54c (step S322).

In response to the distribution of the determined protocol 54c, operations for switching the communication protocol to "HTTP" are executed in both of the mobile telephone terminals 20a and 20b in the same manner as the steps S304 to 305 and S314 to 315 described above (steps S308 to 309 and S318 to 319). Thereafter, same actions are continued in each of the mobile telephone terminals 20a, 20b and the content sharing server 10.

Figure 9:
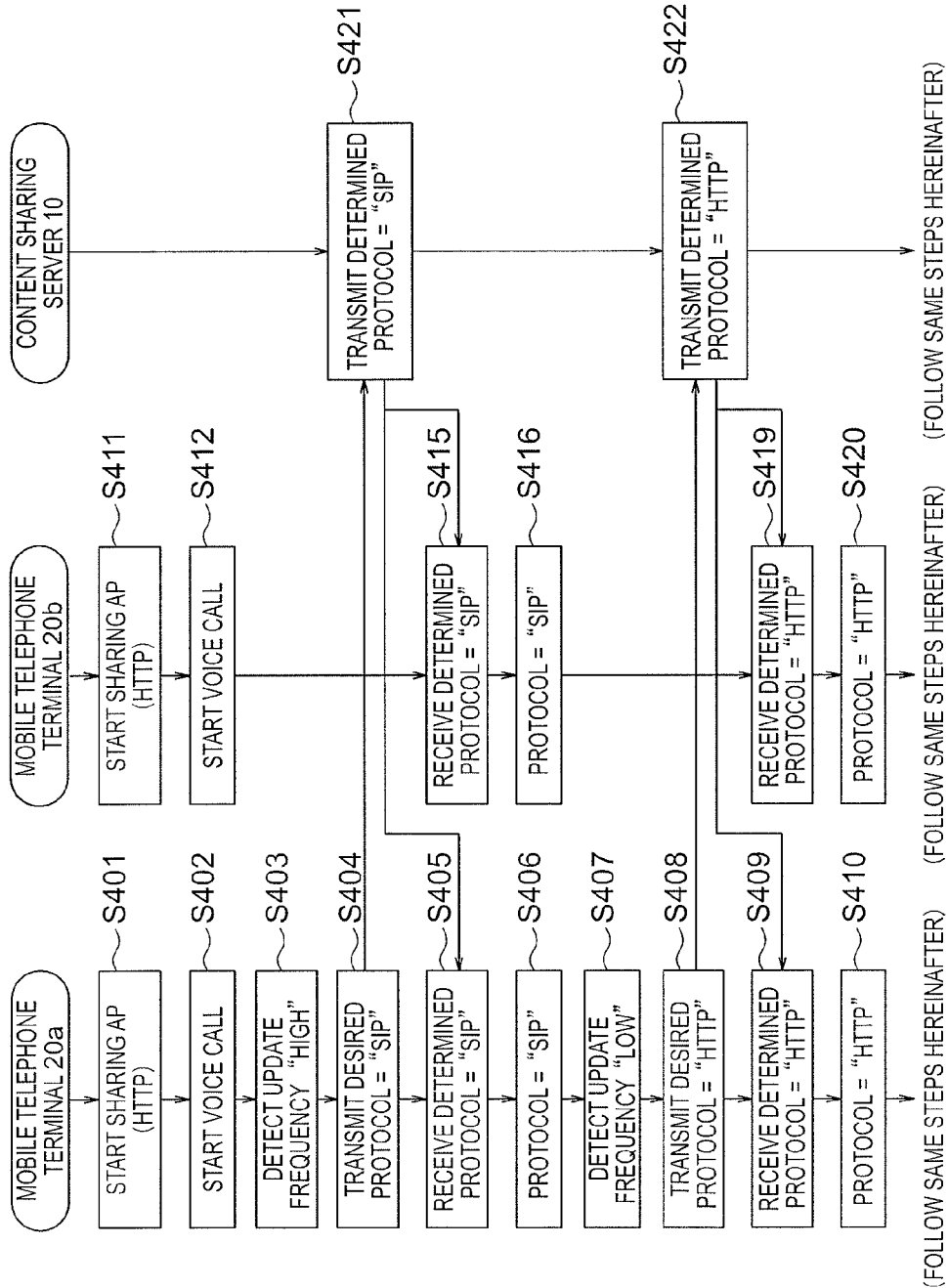
FIG. 9 is an explanatory chart showing an example of actions of protocol switching in accordance with the frequency of update made on the content in a case where the mobile telephone terminals share a same content in the content sharing system shown in FIG. 1.

FIG. 9 is an explanatory chart showing an example of operations of protocol switching in association with the frequency of update made on the content 39 in a case where the mobile telephone terminals 20a and 20b share the same content 39 in the content sharing system 1 shown in FIG. 1. First, the mobile telephone terminal 20a as one of the terminals starts up the sharing AP32 to be in a standby state (step S401, corresponds to step S101 of FIG. 4). In parallel to that, the mobile telephone terminal 20b as the other terminal starts up the sharing AP32 to be in a standby state (step S411, corresponds to step S101 of FIG. 4).

No voice call is performed in steps S401 and 411 as in the case of FIG. 8, so that the call state 38e shows "standby" and the protocol to be selected is "HTTP". Note here that the initial values of the desired protocols 54a, 54b of the both terminals and the determined protocol 54c registered as the protocol determining data 54 in the content sharing server 10 are "HTTP".

The voice call control unit 31 in the mobile telephone terminal 20a as one of the terminals tries to call the mobile telephone terminal 20b as the other terminal to start a voice call (step S402, corresponds to step S102 of FIG. 4). When the mobile telephone terminal 20b as the other terminal responds to the call, the voice call is started (step S412, corresponds to step S102 of FIG. 4).

However, unlike the example shown in FIG. 8, the desired protocol 38e="HTTP" is set herein as the initial state at the time of starting a call in the sharing AP32. Thus, it is not judged in the mobile telephone terminals 20a and 20b that "it is necessary to switch the communication protocol", so that the communicating action is continued while keeping "HTTP" as the communication protocol.

As the communication continues, when the communication frequency measurement unit 35 of the mobile telephone terminal 20a detects that the number of incremental update commands transmitted from the mobile telephone terminal 20a for the content 39 within a prescribed time has exceeded a prescribed threshold value and updates the update frequency 38d to "higher" from "lower", the protocol selection unit 37 of the mobile telephone terminal 20a detects it (step S403) and transmits the desired protocol 38e="SIP" to the content sharing server 10 (step S404, corresponds to step S106 of FIG. 4).

The content sharing server 10 upon receiving that transmits the desired protocol 38e (54a)="SIP" of the mobile telephone terminal 20a to both of the mobile telephone terminals 20a and 20b as the determined protocol 54c (step S421, corresponds to step S202 of FIG. 7).

The mobile telephone terminal 20a upon receiving the determined protocol 54c="SIP" (step S405, corresponds to step S107 of FIG. 4) switches the communication protocol to "SIP" in response to that (step S406, corresponds to step S108 of FIG. 4). Further, the mobile telephone terminal 20b upon receiving the determined protocol 54c="SIP" (step S415, corresponds to step S103 of FIG. 4) also switches the communication protocol to "SIP" in response to that (step S416, corresponds to step S104 of FIG. 4).

As the communication continues further, when the communication frequency measurement unit 35 of the mobile telephone terminal 20a detects that the number of incremental update commands transmitted from the mobile telephone terminal 20a for the content 39 within a prescribed time has become less than a prescribed threshold value and updates the update frequency 38d to "lower" from "higher", the protocol selection unit 37 of the mobile telephone terminal 20a detects it (step S407) and transmits the desired protocol 38e="HTTP" to the content sharing server 10 (step S408, corresponds to step S106 of FIG. 4).

The content sharing server 10 upon receiving that transmits the desired protocol 38e (54a)="HTTP" of the mobile telephone terminal 20a to both of the mobile telephone terminals 20a and 20b as the determined protocol 54c (step S422, corresponds to step S202 of FIG. 7).

The mobile telephone terminal 20a upon receiving the determined protocol 54c="HTTP" (step S409, corresponds to step S107 of FIG. 4) switches the communication protocol to "HTTP" in response to that (step S410, corresponds to step S108 of FIG. 4). Further, the mobile telephone terminal 20b upon receiving the determined protocol 54c="HTTP" (step S419, corresponds to step S103 of FIG. 4) also switches the communication protocol to "HTTP" in response to that (step S420, corresponds to step S104 of FIG. 4). Thereafter, same actions are continued in each of the mobile telephone terminals 20a, 20b and the content sharing server 10.

Figure 10:
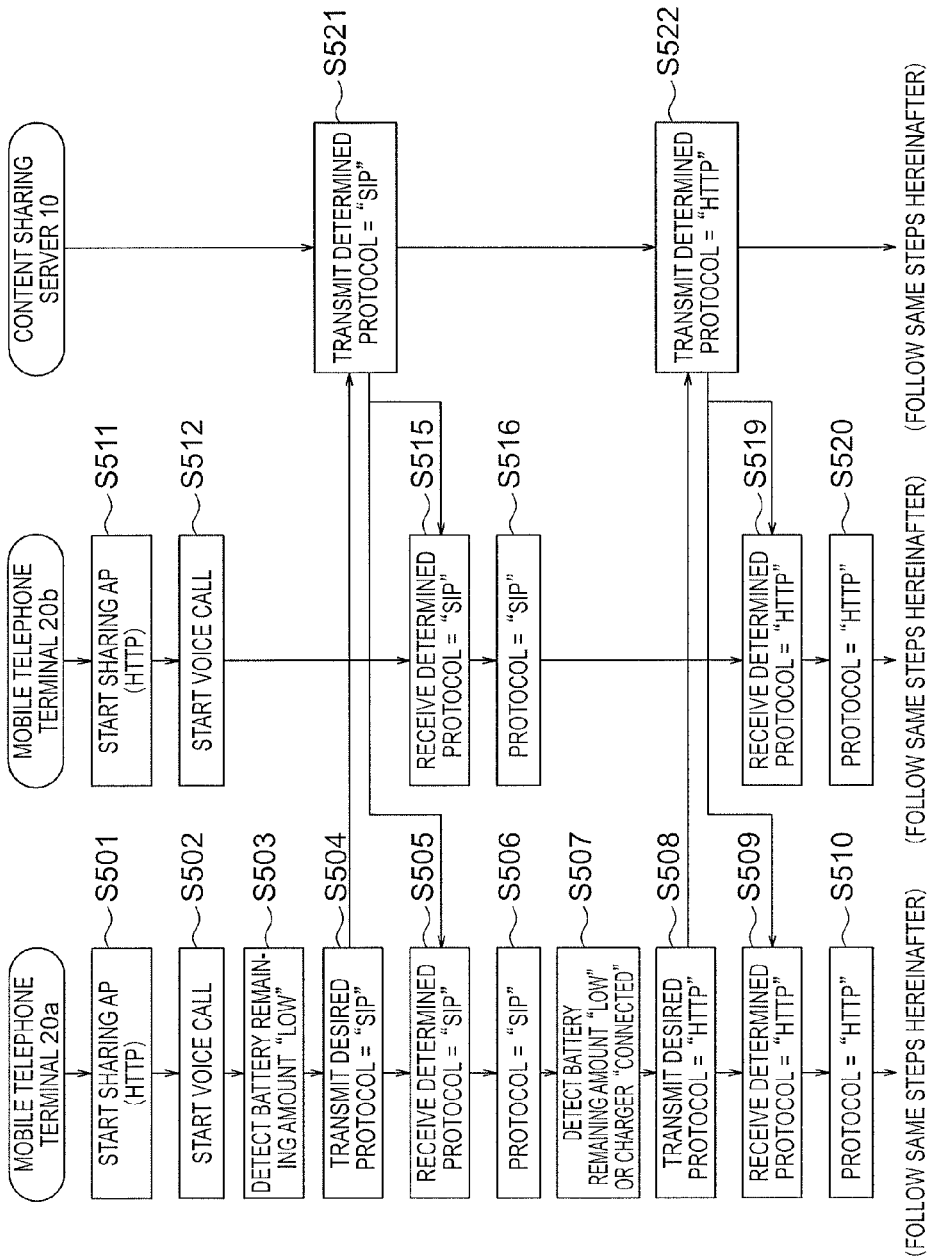
FIG. 10 is an explanatory chart showing an example of actions of protocol switching in accordance with the power state of one of the mobile telephone terminals in a case where the mobile telephone terminals share a same content in the content sharing system shown in FIG. 1.

FIG. 10 is an explanatory chart showing an example of operations of protocol switching in association with the power state of the mobile telephone terminal 20a as one of the terminals in a case where the mobile telephone terminals 20a and 20b share the same content 39 in the content sharing system 1 shown in FIG. 1. First, the mobile telephone terminal 20a as one of the terminals starts up the sharing AP32 to be in a standby state (step S501, corresponds to step S101 of FIG. 4). In parallel to that, the mobile telephone terminal 20b as the other terminal starts up the sharing AP32 to be in a standby state (step S511, corresponds to step S101 of FIG. 4).

No voice call is performed in steps S501 and 511 as in the case of FIG. 8, so that the call state 38a shows "standby" and the protocol to be selected is "HTTP". The initial values of the desired protocols 54a, 54b of the both terminals and the determined protocol 54c registered as the protocol determining data 54 are "HTTP" also in the content sharing server 10.

The voice call control unit 31 in the mobile telephone terminal 20a as one of the terminals tries to call the mobile telephone terminal 20b as the other terminal to start a voice call (step S502, corresponds to step S102 of FIG. 4). When the mobile telephone terminal 20b as the other terminal responds to the call, the voice call is started (step S512, corresponds to step S102 of FIG. 4). As in the case of the example shown in FIG. 8, the desired protocol 38e="HTTP" is set as the initial state at the time of starting a call in the sharing AP32. Thus, the communicating action is continued while keeping "HTTP" as the communication protocol.

As the communication continues, when the power state confirmation unit 36 of the mobile telephone terminal 20a detects that the remaining amount of the rechargeable battery 26a of the one mobile telephone terminal 20a is decreased and has exceeded a prescribed threshold value and updates the battery remaining amount 38b to "lower" from "higher" and the charger connection 38c is in a state of "unconnected", the protocol selection unit 37 of the mobile telephone terminal 20a detects it (step S503) and transmits the desired protocol 38e="SIP" to the content sharing server 10 (step S504, corresponds to step S106 of FIG. 4).

The content sharing server 10 upon receiving that transmits the desired protocol 38e (54a)="SIP" of the mobile telephone terminal 20a to both of the mobile telephone terminals 20a and 20b as the determined protocol 54c (step S521, corresponds to step S202 of FIG. 7).

The mobile telephone terminal 20a upon receiving the determined protocol 54c="SIP" (step S505, corresponds to step S107 of FIG. 4) switches the communication protocol to "SIP" in response to that (step S506, corresponds to step S108 of FIG. 4). Further, the mobile telephone terminal 20b upon receiving the determined protocol 54c="SIP" (step S515, corresponds to step S103 of FIG. 4) also switches the communication protocol to "SIP" in response to that (step S516, corresponds to step S104 of FIG. 4).

As the communication continues further, when the rechargeable battery 26a of the mobile telephone terminal 20a is exchanged and the battery remaining amount 38b comes in a state of "higher" or the AC adapter 26b is connected to the mobile telephone terminal 20a and the charger connection 38c comes in a state of "connected", the power state confirmation unit 36 acquires those facts and updates the corresponding part of the protocol selection data 38.

Then, the protocol selection unit 37 of the mobile telephone terminal 20a detects it (step S507) and transmits the desired protocol 38e="HTTP" to the content sharing server 10 (step S508, corresponds to step S106 of FIG. 4).

The content sharing server 10 upon receiving that transmits the desired protocol 38e (54a)="HTTP" of the mobile telephone terminal 20a to both of the mobile telephone terminals 20a and 20b as the determined protocol 54c (step S522, corresponds to step S202 of FIG. 7).

The mobile telephone terminal 20a upon receiving the determined protocol 54c="HTTP" (step S509, corresponds to step S107 of FIG. 4) switches the communication protocol to "HTTP" in response to that (step S510, corresponds to step S108 of FIG. 4). Further, the mobile telephone terminal 20b upon receiving the determined protocol 54c="HTTP" (step S519, corresponds to step S103 of FIG. 4) also switches the communication protocol to "HTTP" in response to that (step S520, corresponds to step S104 of FIG. 4). Thereafter, same actions are continued in each of the mobile telephone terminals 20a, 20b and the content sharing server 10.

(Overall Actions of First Exemplary Embodiment)

Next, overall actions of the above-described exemplary embodiment will be described. The protocol switching method according to the exemplary embodiment is used in the content sharing system 1 constituted by mutually connecting a plurality of terminal devices (the mobile telephone terminals 20) which can perform voice calls and data communication mutually, the switching equipment 40, and the content sharing server 10. With the method, same contents are stored inside the both terminal devices, the content sharing server 10 mediates the data communication between the terminals devices (FIG. 4/step S101), the switching equipment 40 mediates the voice calls between the terminal devices (FIG. 4/step S102), the content sharing application in one of the terminal devices generates an incremental update command for reflecting the content of an operation upon the same content according to the operation done by the user on the content and transmits it to the other terminal device, the protocol selection unit selects the communication protocol out of the first and second communication protocols for performing the data communication according to the state of the terminal devices and transmits it to the content sharing server as the desired protocol (FIG. 4/step S106), the protocol determining unit of the content sharing server determines the determined protocol among the desired protocols from all the terminal devices and transmits it to all the terminal devices (FIG. 7/steps S201 to 202), and the protocol selection unit in all the terminal devices receives the determined protocol from the content sharing sever (FIG. 4/step S107) and employs the determined protocol as the communication protocol (FIG. 4/step S108).

Note here that each of the above-described steps may be put into programs to be executed by a computer, and may have those executed by the main calculation control modules 21 and 11 of the mobile telephone terminals 20 and the content sharing server 10 which are the computers directly execute each of the steps. The program may be recorded on a non-transitory recording medium such as a DVD, a CD, a flash memory, or the like. In that case, the program is read out from the recording medium and executed by a computer.

Through this action, the exemplary embodiment can provide following effects.

With the exemplary embodiment, it is possible to select the optimum communication protocol according to the action state between the mobile telephone terminals 20 and, more specifically, according to the state such as the communication state, the remaining amount of the rechargeable battery, and the like. This makes it possible to decrease the power consumption in the terminals and to suppress the consumption of the server resource at the same time.

Second Exemplary Embodiment

In the second exemplary embodiment of the present invention, each of the terminals is constituted with a set of a telephone 621 provided only with a voice call module and a computer device (notebook PC 620) provided with the structure of the terminal device except for the voice call module. At the same time, switching equipment 640 is structured by including a call state informing module 640b which informs a content sharing server 610 that a voice call is started between the telephones.

With this structure, the same effects as those of the first exemplary embodiment can be achieved even in a case of using a combination of the notebook PC 620 and the telephone 621 which are not linked mutually.

Hereinafter, this will be described in more details.

Figure 11:
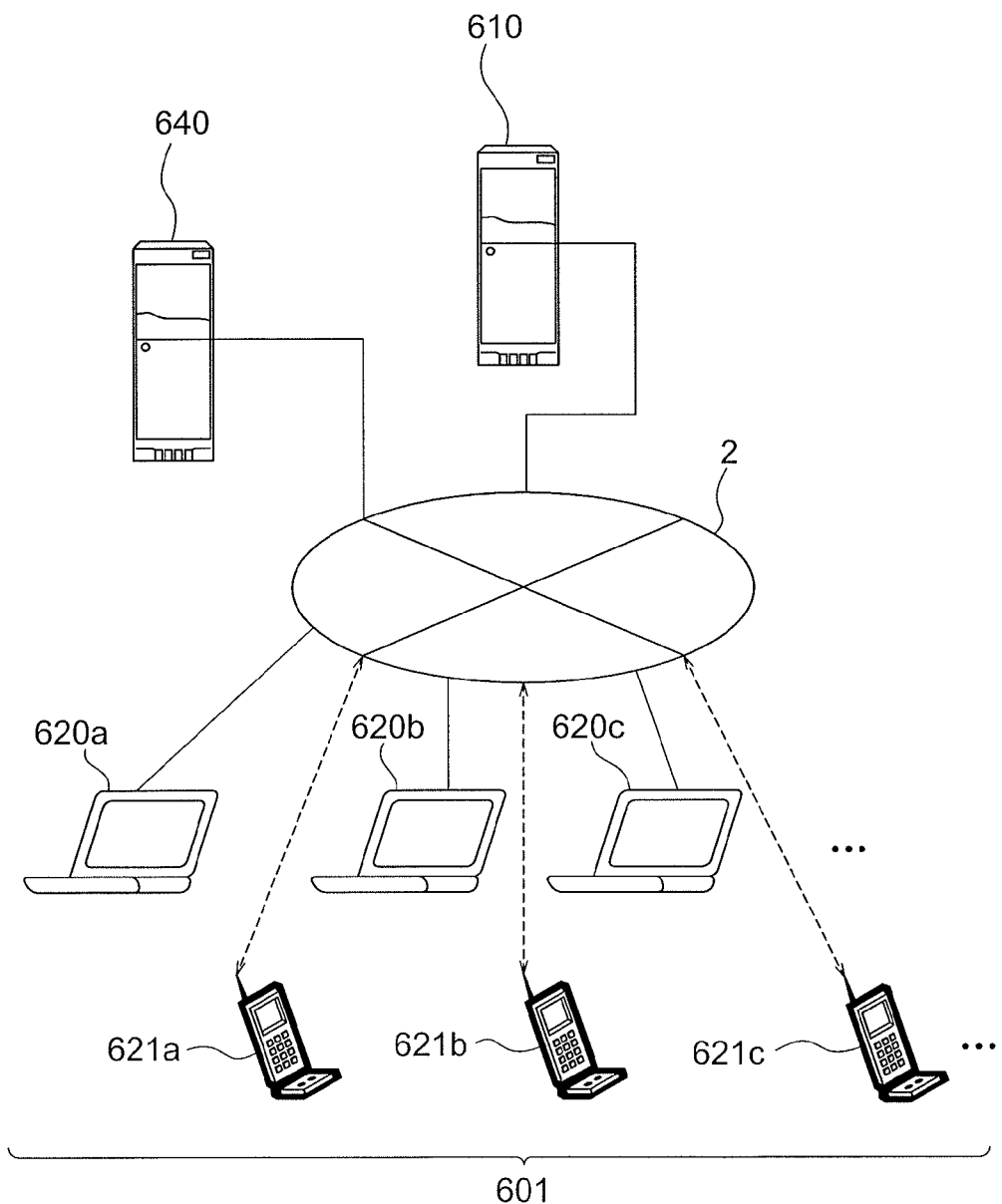
FIG. 11 is an explanatory chart showing the structure of a content sharing system according to a second exemplary embodiment of the present invention.

FIG. 11 is an explanatory chart showing the structure of a content sharing system 601 according to the second exemplary embodiment of the present invention. In the content sharing system 601, each of the mobile telephone terminals 20a, 20b, 20c, - - - of the content sharing system 1 according to the first exemplary embodiment described above is replaced with notebook-type personal computers (notebook PCs) 620a, 620b, 620c, - - - and the telephones 621a, 621b, 621c, - - - . Further, the content sharing server 10 and the switching equipment 40 of the content sharing system 1 according to the first exemplary embodiment are replaced with different content sharing server 610 and switching equipment 640, respectively.

The notebook PCs 620a, 620b, 620c, - - - can perform operations regarding sharing of the contents via the content sharing server 10 as in the case of the first exemplary embodiment. The telephones 621a, 621b, 621c, - - - can perform voice calls via the switching equipment 640 as in the case of the first exemplary embodiment. Hereinafter, as in the case of the first exemplary embodiment, the notebook PCs 620a, 620b, 620c, - - - are referred to as the notebook PCs 620 as a general term, and the telephones 621a, 621b, 621c, - - - are referred to as the telephones 621 as a general term. Needless to say, each of the notebook PCs 620 and the telephones 621 may also be other types of terminals.

The notebook PC 620a and the telephone 621a, the notebook PC 620b and the telephone 621b, the notebook PC 620c and the telephone 621c, - - - correspond to the same users, respectively. Each of the notebook PCs 620 and the telephones 621 is operated and used independently. However, the notebook PC 620 and the telephone 621 corresponding to the same user do not have a means for grasping the operation state mutually. So, it is not possible to perform the same actions as those of the first exemplary embodiment. Thus, in the exemplary embodiment, the content sharing server 610 and the switching equipment 640 work in an associated manner as will be described later for making it possible to grasp the mutual operation states of the notebook PC 620 and the telephone 621.

Figure 12:
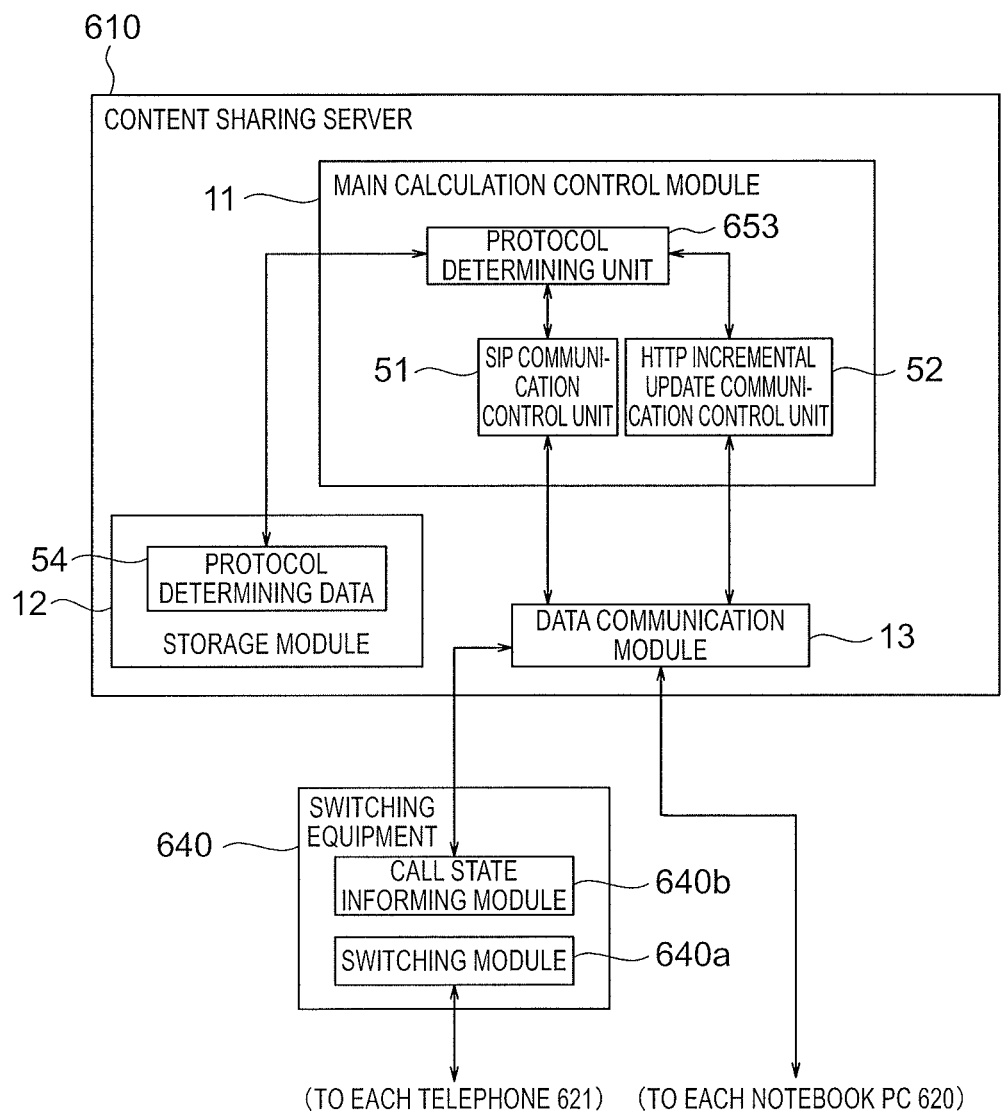
FIG. 12 is an explanatory chart showing the structures of the content sharing server and switching equipment shown in FIG. 11.

FIG. 12 is an explanatory chart showing the structures of the content sharing server 610 and switching equipment 640 shown in FIG. 11. The switching equipment 640 according to the exemplary embodiment includes: a switching module 640a which switches and mediates the vocal calls between each of the telephones 621; and the call state informing module 640b which informs the content sharing server 610 that the voice call is started between the telephones 621 via the public communication net 2.

The content sharing server 610 is the same as the content sharing server 10 according to the first exemplary embodiment shown in FIG. 5A in terms of hardware. The only difference is that the protocol determining unit 53 operated by the main calculation control module 11 is replaced with another protocol determining unit 653. The protocol determining unit 653 acquires the voice call state between the telephones 621 from the call state informing module 640b of the switching equipment 640, and determines the protocol SIP or HTTP to perform the communication according to that.

Figure 13A:
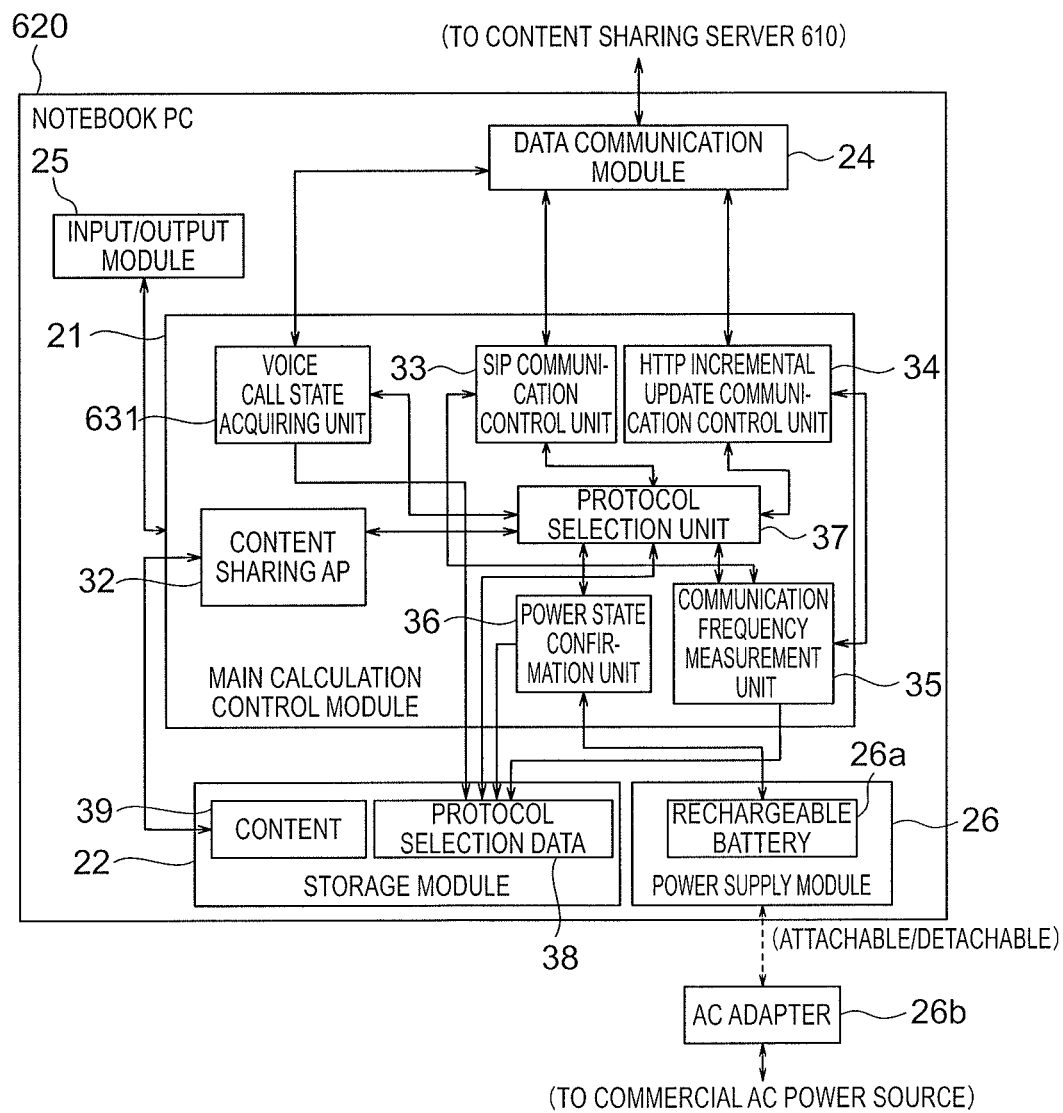
Figure 13B:
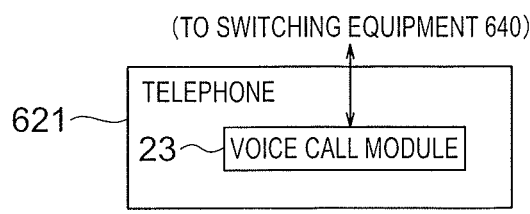

FIG. 13 shows explanatory charts of the structures of the notebook PC 620 and the telephone 621 shown in FIG. 11. FIG. 13A shows the notebook PC 620 and FIG. 13B shows the telephone 621, respectively. The notebook PC 620 shown in FIG. 13A has the basic structure as a computer, and it is also considered as the structure that is acquired by isolating the function regarding the voice call from the mobile telephone terminal 20 according to the first exemplary embodiment as the telephone 621 shown in FIG. 13B.

That is, the notebook PC 620 includes: a main calculation control module 21 as the main body for executing computer programs; a storage module 22 which stores data; a data communication module 24 which performs the data communication with other notebook PCs; an input/output module 25 which receives operations from the user and presents the processing result to the user; and a power supply module 26 which supplies the power required for operations of each of the above-described units. Further, the telephone 621 includes a voice call module 23.

The power supply module 26 includes a rechargeable battery 26a inside thereof. Further, an AC adapter 26b for converting a commercial alternating current power source to a direct current with which the notebook PC 620 can be operated is provided thereto in a detachable manner. While the AC adapter 26b is being connected to the power supply module 26, the notebook PC 620 is operated by the direct current supplied from the AC adapter 26b. At the same time, the battery 26a is charged also by the direct current.

In the main calculation control module 21, the content sharing application 32, an SIP communication control unit 33, an HTTP incremental update communication control unit 34, a communication frequency measurement unit 35, a power state confirmation unit 36, and the protocol selection unit 37 are so structured to have the respective functions to be described later executed as respective computer programs. Further, protocol selection data 38 and a content 39 as the target shared by the notebook PCs 620a and 620b are stored in the storage module 22.

Each unit and each data described above are same as those described regarding the mobile telephone terminals 20 according to the first exemplary embodiment. Thus, those are referred under same names and same reference numerals. The contents of the actions and the effects acquired thereby are same as those described regarding the mobile telephone terminals 20 according to the first exemplary embodiment.

In addition to those, in the main calculation control module 21 of the notebook PC 620, the voice call state acquiring unit 631 is structured to have its function executed as a computer program. The voice call state acquiring unit 631 acquires the call state ("calling" or "standby") of the telephone 621 from the content sharing server 610 (corresponds to the notebook PC 620), and updates the value of the call state 38a of the protocol selection data 38 according to that. Thereby, the protocol selection unit 37 can perform the same actions as those of the first exemplary embodiment.

Figure 14:
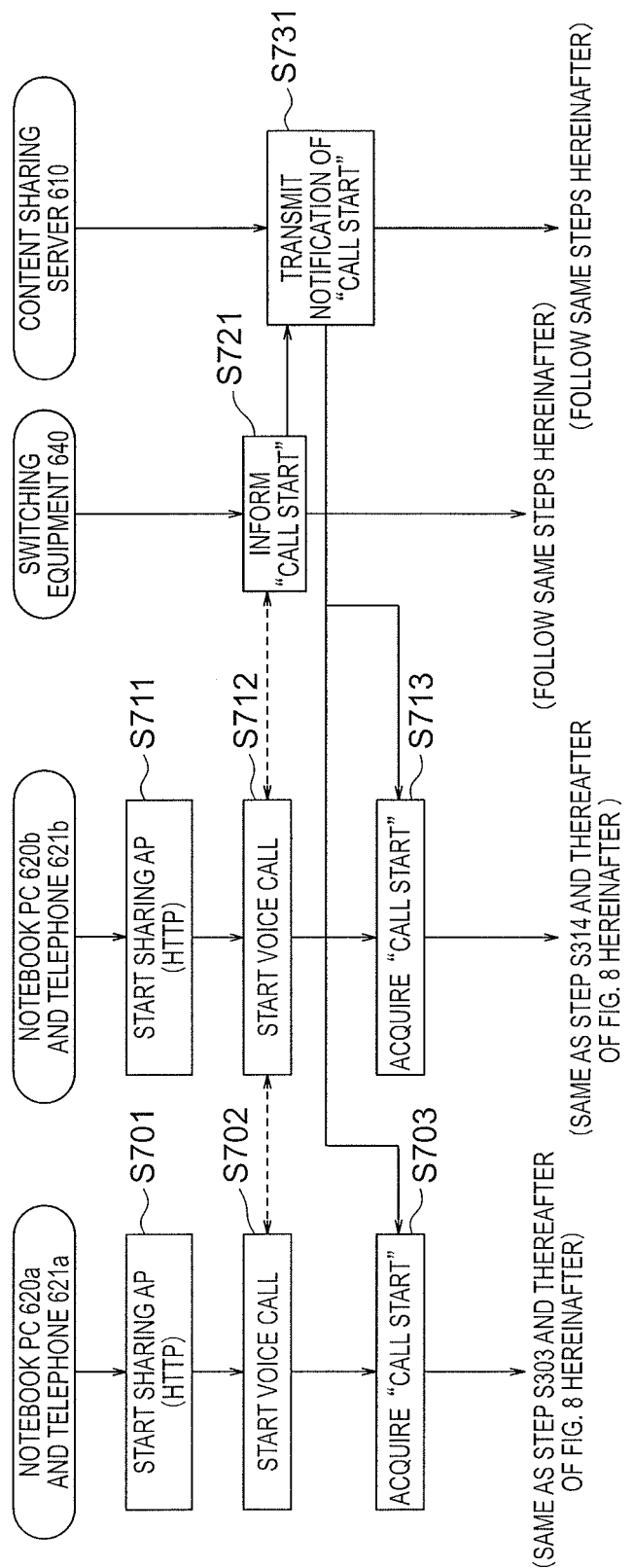
FIG. 14 is an explanatory chart showing an example of actions for acquiring a communication state between the telephones when the notebook PCs share a same content in the content sharing system shown in FIG. 11.

FIG. 14 is an explanatory chart showing an example of operations for acquiring a communication state between the telephones 621a and 621b when the notebook PCs 620a and 620b share the same content 39 in the content sharing system 601 shown in FIG. 11. First, the notebook PC 620a as one of the PCs starts up the sharing AP32 to be in a standby state (step S701, corresponds to step S301 of FIG. 8). In parallel to that, the notebook PC 620b as the other PC starts up the sharing AP32 to be in a standby state (step S711, corresponds to step S311 of FIG. 8).

No voice call is performed in steps S701 and 711, so that the call state 38a shows "standby" and the protocol to be selected is "HTTP". The initial values of the desired protocols 54a, 54b of the both PCs and the determined protocol 54c registered as the protocol determining data 54 in the content sharing server 610 are "HTTP".

Here, the telephone 621 as one of the telephones tries to call the other telephone 621b to start a voice call (step S702, corresponds to step S302 of FIG. 8). When the telephone 621b as the other telephone responds to the call, the voice call is started (step S712, corresponds to step S312 of FIG. 84).

Upon this, the call state informing module 640b detects the start of the voice call between the telephones 621a and 621b, and informs the content sharing server 610 that the voice call is started (step S721). The protocol determining unit 653 of the content sharing server 610 upon receiving the notification informs the notebook PCs 620a and 620b corresponding to the respective telephones 621a and 621b informs that the voice call is started (step S731).

In the notebook PCs 620a and 620b, the call state acquiring unit 631 receives the notification of the start of the voice call and updates the values of the call state 38a of the respective protocol selection data 38 to "calling" (steps S703 and 713). In response to that, the action for changing the communication protocol to "SIP" or "HTTP" acceding to the start and end of the voice call is executed as in the case of steps S303 and 314 of FIG. 8 and thereafter.

As described above, with the structure where the call state between the telephones 621a and 621b is informed from the switching equipment 640 to each of the notebook PCs 620 via the content sharing server 610, it is possible to perform actions in the same manner as the case of the first exemplary embodiment and to achieve the same effects even when the notebook PCs 620 and the telephones 621 are not working in an associated manner but are independent form each other.

Third Exemplary Embodiment

In the third exemplary embodiment of the present invention, a protocol determining unit 853 of a content sharing server 810 determines a first communication protocol as the determined protocol when there is one or more terminal device whose desired protocols are the first communication protocol among a plurality of terminal devices 20, and determines a second communication protocol as the determined protocol when the desired protocols of the all the terminal devices are the second communication protocol.

With this structure, the same effect as that of the first exemplary embodiment can be achieved even in a case where actions for sharing the content are executed with three or more terminal devices that are same as those of the first exemplary embodiment.

Hereinafter, this will be described in more details.

Figure 15:
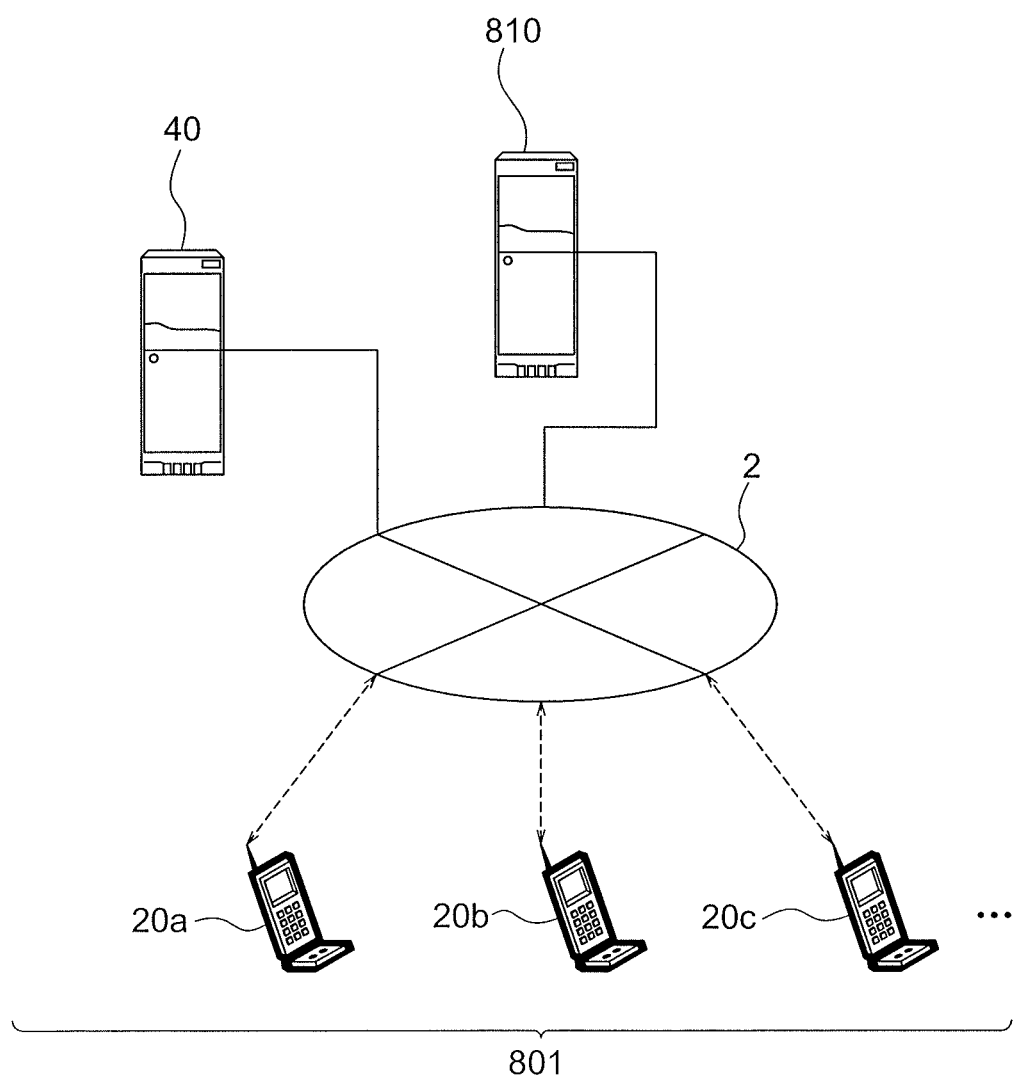
FIG. 15 is an explanatory chart showing the structure of a content sharing system according to a third exemplary embodiment of the present invention.

FIG. 15 is an explanatory chart showing the structure of a content sharing system 801 according to the third exemplary embodiment of the present invention. In the content sharing system 801, each of a plurality of the mobile telephone terminals 20a, 20b, 20c, - - - same as those of the content sharing system 1 according to the first exemplary embodiment described above is structured to be connectable to the voice call switching equipment 40 and the data communication content sharing server 810 via a public communication net 2 including radio communications. The only difference with respect to the content sharing system 1 is that the content sharing server 10 is replaced with another content sharing server 810.

Figure 16:
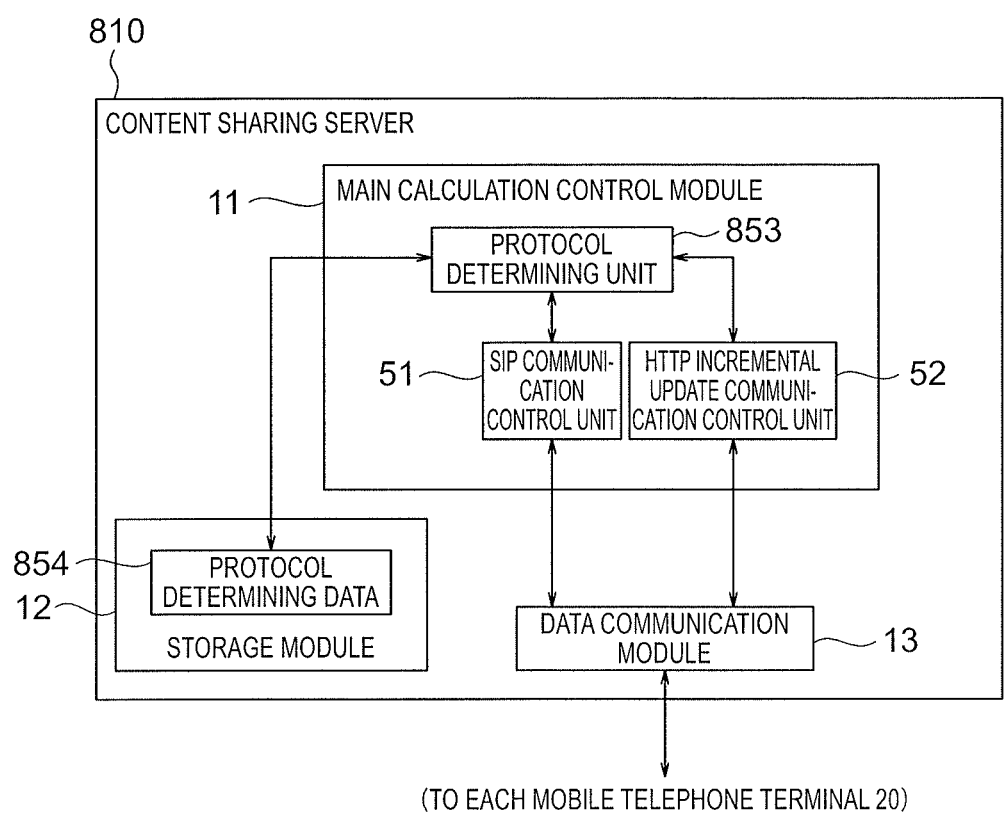
FIG. 16 is an explanatory chart showing the more detailed structure of the content sharing server shown in FIG. 15.

FIG. 16 is an explanatory chart showing the more detailed structure of the content sharing server 810 described in FIG. 15. The content sharing server 810 is the same as the content sharing server 10 according to the first exemplary embodiment shown in FIG. 5A in terms of hardware. The only differences are that the protocol determining unit 53 operated by the main calculation control module 11 is replaced with another protocol determining unit 853 and that the protocol determining data 54 is replaced with another protocol determining data 854, respectively.

Figure 17:
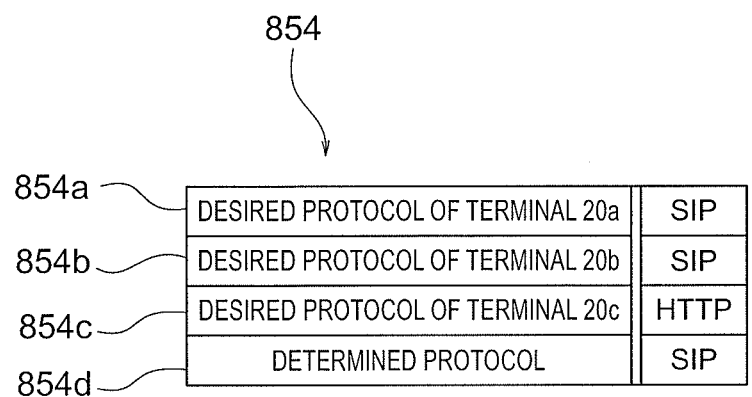
FIG. 17 is an explanatory chart showing an example of a content of protocol determining data shown in FIG. 16.

FIG. 17 is an explanatory chart showing an example of the content of protocol determining data 854 described in FIG. 16. The example shown in FIG. 17 illustrates the state where three mobile telephone terminals 20a, 20b, and 20c shown in FIG. 1 are currently communicating with each other. In this case, the protocol determining data 854 contains desired protocols 854a to 854c of the respective mobile telephone terminals 20a to 20c and a determined protocol 854d determined based thereupon by the protocol determining unit 853.

The content sharing system 801 is capable of performing the same action for sharing the content as those of the first and second exemplary embodiments with the three or more mobile telephone terminals 20a, 20b, 20c, - - - . The action itself for sharing the content is the same as the case of the two mobile telephone terminals 20a and 20b described above.

In the case of the two mobile telephone terminal 20a and 20b, however, when one of the terminals transmits a desired protocol that is different from the current communication protocol, that protocol simply needs to be transmitted as the determined protocol to the other terminal. In the meantime, in the case where the three or more mobile telephone terminals 20a, 20b, 20c, - - - are executing the actions for sharing the content mutually, the criteria for judging the communication protocol for achieving the effect of suppressing the power consumption and the load on the network is required.

Figure 18:
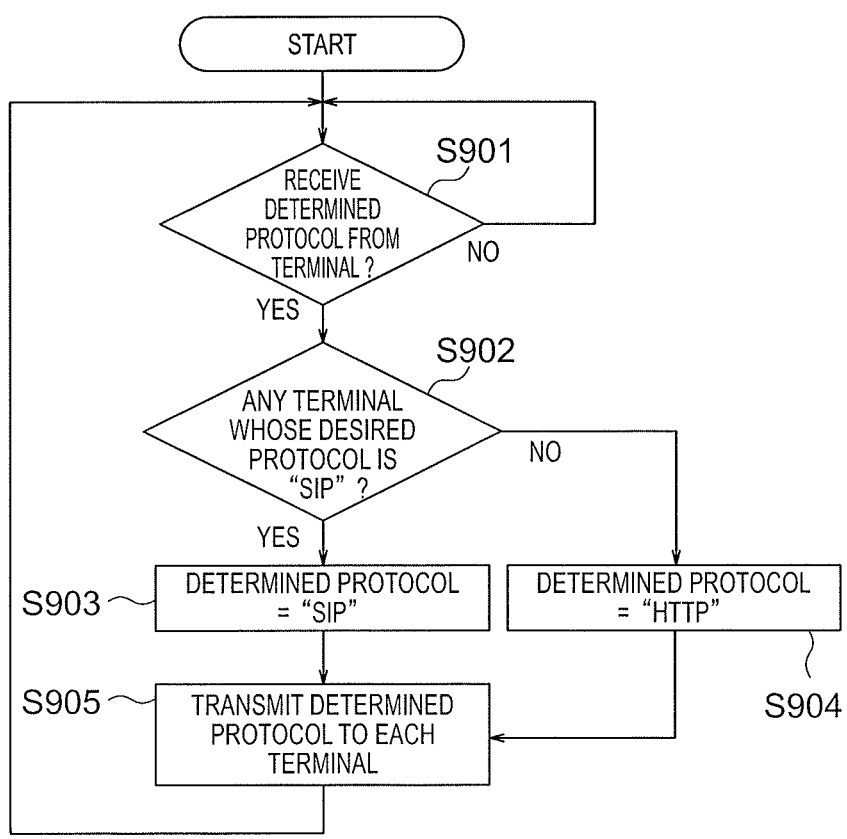
FIG. 18 is a flowchart showing actions of a protocol determining unit shown in FIG. 16.
Figure 19:
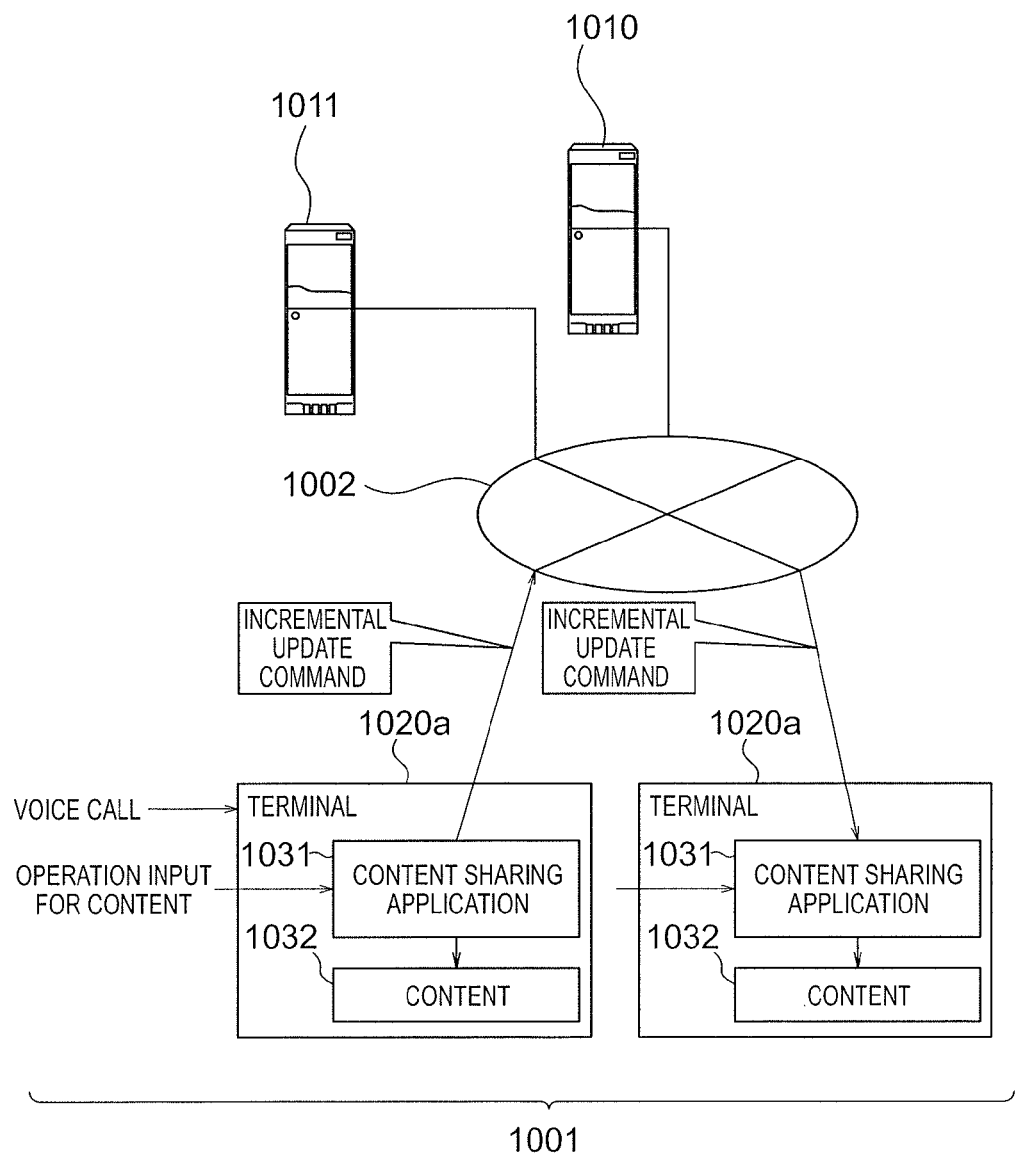
FIG. 19 is an explanatory chart showing the structure of an existing content sharing system.

FIG. 18 is a flowchart showing actions of the protocol determining unit 853 shown in FIG. 16. When a desired protocol 38e is received from one of the currently communicating mobile telephone terminals 20 (Yes in step S901), the protocol determining unit 853 judges whether or not there is one or more terminal(s) whose desired protocol is "SIP" among the three or more mobile telephone terminals (step S902).

When there is one or more terminal(s) whose desired protocol is "SIP" (Yes in step S902), it is determined as the determined protocol 854d="SIP" (step S903). When all the desired protocols of the currently communicating mobile telephone terminals are "HTTP" (No in step S902), it is determined as the determined protocol 854d="HTTP" (step S904).

Then, the determined protocol 854d determined in step S903 or S904 is transmitted to each of the mobile telephone terminals 20 (step S905). At the same time, the protocol determining unit 853 stores the desired protocols 854a to 854c and the determined protocol 854d also in the protocol determining data 854.

As described above, in order to achieve the effect of decreasing the power consumption of each terminal, it is effective to perform the communication by using SIP rather than using HTTP. Thus, when there is even one mobile telephone terminal 20 whose desired protocol is "SIP", it is desirable for all the terminals to perform the communication by conforming to that.

Other than the one described above, as the criteria for determining the determined protocol when performing the action for sharing the content among the three or more mobile telephone terminals 20 described in step S902 of FIG. 18, it is possible to set the criteria according to the inherent circumstances and the like of each of the content sharing systems as a rule through selecting it arbitrarily by those skilled in the art.

For example, it is possible to perform a majority vote among the three or more mobile telephone terminals 20 to determine the communication protocol preferred by a greater number of mobile telephone terminals 20 out of "SIP" and "HTTP" as the determined protocol.

Alternatively, it is also possible to compare the ratio of the number of mobile telephone terminals whose desired protocols are "HTTP" to the number of the entire mobile telephone terminals communicating with each other with a specific threshold value given in advance, and to select "HTTP" as the determined protocol when the former is larger than the latter but to select "SIP" if not.

This is because a great amount of the server resource is consumed in the content sharing server 810 when the entire communication protocols are determined as "SIP" when there is an extremely small number of terminal with a small battery remaining amount in a case particularly where a large number of mobile telephone terminals are executing the action for sharing the content. Therefore, there is a possibility of increasing the operation cost as the entire content sharing system.

Further with the content sharing system described in the second exemplary embodiment which utilizes the notebook PC and the telephone which are not working in an associated manner, it is also possible to achieve the same effects as those of the first exemplary embodiment through determining the determined protocol by the criteria even when three or more sets of the notebook PCs and the telephones execute the actions for sharing the content.

While the present invention has been described above by referring to the specific embodiments shown in the drawings, the present invention is not limited only to the embodiments described above. Any other known structures can be employed, as long as the embodiments of the present invention can be achieved therewith.

Regarding each of the embodiments described above, the new technical contents thereof can be summarized as follows. While a part of or a whole part of the embodiments can be summarized as follows as the new techniques, the present invention is not necessarily limited only to the followings.

(Supplementary Note 1)

A content sharing system constituted by mutually connecting a plurality of terminal devices capable of mutually performing a voice call and data communication, switching equipment which mediates the voice call between each of the terminal devices, and a content sharing server which mediates the data communication between each of the terminal devices, wherein each of the terminal devices includes:
  a voice call module which performs the voice call;
  a content sharing application which generates an incremental update command in response to a user operation done by one of the terminal devices made on a same content stored inside the both terminals for reflecting a content of the operation upon the same content in the other terminal device, and transmits it to the other terminal device;
  a first and a second communication control units which perform the data communication with either one of a first and a second communication protocols; and
  a protocol selection unit which selects either one of the first and second communication protocols according to states of each of the terminal devices, transmits it to the content sharing server as a desired protocol, and employs a determined protocol received from the content sharing server as the communication protocol.

(Supplementary Note 2)

The content sharing system as depicted in Supplementary Note 1, wherein
  the protocol selection unit of each of the terminal devices detects that the voice call is started or ended, and selects either one of the first and second communication protocols.

(Supplementary Note 3)

The content sharing system as depicted in Supplementary Note 2, wherein
  the protocol selection unit of the terminal device selects the first communication protocol when the voice call is started, and selects the second communication protocol when the voice call is ended.

(Supplementary Note 4)

The content sharing system as depicted in Supplementary Note 2, wherein
  the protocol selection unit of each of the terminal devices detects transmission frequency of the incremental update command generated by the content sharing application, and selects either one of the first and second communication protocols.

(Supplementary Note 5)

The content sharing system as depicted in Supplementary Note 4, wherein
  the protocol selection unit of the terminal device selects the first communication protocol when the transmission frequency of the incremental update command is higher than a threshold value given in advance, and selects the second communication protocol when the transmission frequency of the incremental update command is lower than the threshold value.

(Supplementary Note 6)

The content sharing system as depicted in Supplementary Note 2, wherein
  the protocol selection unit of each of the terminal devices detects remaining amount of a battery inside a power source device provided to itself, and selects either one of the first and second communication protocols.

(Supplementary Note 7)

The content sharing system as depicted in Supplementary Note 6, wherein
  the protocol selection unit of the terminal device selects the first communication protocol when the remaining amount of the battery is lower than a threshold value given in advance, and selects the second communication protocol when the remaining amount of the battery is higher than the threshold value or the terminal device is connected to a commercial power source.

(Supplementary Note 8)

The content sharing system as depicted in any one of Supplementary Notes 1 to 7, wherein:
  each of the terminal devices is constituted with a set of a telephone provided only with the voice call module and a computer device provided with the structure of the terminal device except for the voice call module; and
  the switching equipment includes a call state informing module which informs the content sharing server that the voice call is started between the telephones.

(Supplementary Note 9)

The content sharing system as depicted in any one of Supplementary Notes 1 to 8, wherein
  the content sharing server includes:
  a first and a second mediating units which mediates the data communication between each of the terminal devices by the first and second communication protocols; and
  a protocol determining unit which receives the desired protocols from each of the terminals devices, determines the determined protocol from the desired protocols of each of all the terminal devices, and transmits it to each of all the terminal devices.

(Supplementary Note 10)

The content sharing system as depicted in Supplementary Note 9, wherein:
  the protocol determining unit of the content sharing server determines the first communication protocol as the determined protocol when there is one or more terminal device whose desired protocol is the first communication protocol in each of the plurality of the terminal devices, and determines the second communication protocol as the determined protocol when the desired protocols of all the terminal devices are the second communication protocol.

(Supplementary Note 11)

The content sharing system as depicted in any one of Supplementary Notes 1 to 10, wherein:
  the first and the second communication protocols are SIP (Session Initiation Protocol) and HTTP (HyperText Transfer Protocol), respectively.

(Supplementary Note 12)

A terminal device which is capable of performing a voice call and data communication and constitutes a content sharing system by being mutually connected to switching equipment which mediates the voice call with other devices and to a content sharing server which mediates the data communication with the other devices, and the terminal device includes:
- a voice call module which performs the voice call;
- a content sharing application which generates an incremental update command in response to a user operation done by one of the terminal devices made on a same content stored inside for reflecting a content of the operation upon the same content in the other terminal device, and transmits it to the other terminal device;
- a first and a second communication control units which perform the data communication with either one of a first and a second communication protocols; and
- a protocol selection unit which selects either one of the first and second communication protocols according to a state of itself, transmits it to the content sharing server as a desired protocol, and employs a determined protocol received from the content sharing server as the communication protocol.

(Supplementary Note 13)

A content sharing server constituting a content sharing system by being mutually connected to a content sharing server which mediates data communication between a plurality of terminal devices capable of performing a voice call and the data communication, and the content sharing server includes:
- a first and a second mediating units which mediates the data communication between each of the terminal devices by the first and second communication protocols; and
- a protocol determining unit which receives the desired protocols from each of the terminal devices, determines the determined protocol from the desired protocols of each of all the terminal devices, and transmits it to each of all the terminal devices.

(Supplementary Note 14)

A protocol switching method used in a content sharing system constituted by mutually connecting a plurality of terminal devices capable of mutually performing a voice call and data communication, switching equipment, and a content sharing server, wherein:
- a same content is stored inside the both terminal devices in advance;
- the switching equipment mediates the voice call between the terminal devices;
- the content sharing server mediates the data communication between each of the terminal devices;
- a content sharing application in one of the terminal devices generates an incremental update command in response to a user operation done by one of the terminal devices made on the content for reflecting a content of the operation upon the same content in the other terminal device, and transmits it to the other terminal device;
- a protocol selection unit of one of the terminal devices selects either one of the first and second communication protocols for performing the data communication according to the state of the terminal device, and transmits it to the content sharing server as a desired protocol;
- a protocol determining unit of the content sharing server determines a determined protocol from the desired protocols received from all the terminal devices, and transmits it to all the terminal devices; and
- the protocol selection unit in all the terminal devices receives the determined protocol from the content sharing server, and employs the determined protocol as the communication protocol.

(Supplementary Note 15)

A protocol switching program used in a content sharing system constituted by mutually connecting a plurality of terminal devices capable of mutually performing a voice call and data communication, switching equipment, and a content sharing server, and the program causes a computer provided to each of the terminal devices to execute:
- a procedure for storing a content that is same as a content of another terminal device in advance;
- a procedure for generating an incremental update command in response to a user operation made on the content for reflecting it upon the same content in the other terminal device, and transmitting it to the other terminal device;
- a procedure for selecting either one of the first and second communication protocols according to a state of the terminal device to perform the data communication, and transmitting it to the content sharing server as a desired protocol; and
- a procedure for receiving a determined protocol from the content sharing sever, and employing the determined protocol as the communication protocol.

(Supplementary Note 16)

A protocol switching program used in a content sharing system connected mutually to a plurality of terminal devices capable of performing a voice call and data communication, and the program causes a computer provided to the content sharing server to execute:
- a procedure for mediating the data communication between the terminal devices by a first and a second communication protocols;
- a procedure for receiving desired protocols from all of the terminal devices, and determining a determined protocol therefrom; and
- a procedure for transmitting the determined protocol that has been determined to each of the terminal devices.

This application claims the Priority right based on Japanese Patent Application No. 2010-238286 filed on Oct. 25, 2010 and the disclosure thereof is hereby incorporated by reference in its entirety.

INDUSTRIAL APPLICABILITY

The present invention can be utilized in a content sharing system which uses IMS (Internet protocol Multimedia Subsystem).

REFERENCE NUMERALS 1, 601, 801 Content sharing system
2 Public communication net
10, 610, 810 Content sharing server
11, 21 Main calculation control module
12, 22 Storage module
13, 24 Data communication module
20, 201, 20b Mobile telephone terminal
23 Voice call module
25 Input/output module
26 Power supply module
26a Rechargeable battery
26b AC adapter
31 Voice call control unit
32 Sharing AP
33 SIP communication control unit
34 HTTP incremental update communication control unit
35 Communication frequency measurement unit
36 Power state confirmation unit 37 Protocol selection unit
38 Protocol selection data
38a Call state
38b Battery remaining amount
38c Charger connection
38d Update frequency
38e, 54a-54b, 854a-854c Desired protocol
39 Content
40, 640 Switching equipment
40a, 640a Switching module
51 SIP communication mediating unit
52 HTTP communication mediating unit
53, 653, 853 Protocol determining unit
54, 854 Protocol determining data
54c, 854d Determined protocol
620, 620a, 620b Notebook PC
621, 621a, 621b Telephone
631 Voice call state acquiring unit
640b Call state informing module

The invention claimed is:

1. A content sharing system constituted by mutually connecting a plurality of terminal devices capable of mutually performing a voice call and data communication, switching equipment which mediates the voice call between each of the terminal devices, and a content sharing server which mediates the data communication between each of the terminal devices, wherein each of the terminal devices comprises:
a voice call module which performs the voice call;
a content sharing application which generates an incremental update command in response to a user operation done by one of the terminal devices made on a same content stored inside the both terminals for reflecting a content of the operation upon the same content in the other terminal device, and transmits it to the other terminal device;
a first and a second communication control units which perform the data communication with either one of a first and a second communication protocols; and
a protocol selection unit which selects either one of the first and second communication protocols according to states of each of the terminal devices, transmits it to the content sharing server as a desired protocol, and employs a determined protocol received from the content sharing server as the communication protocol.

2. The content sharing system as claimed in claim 1, wherein
the protocol selection unit of each of the terminal devices detects that the voice call is started or ended, and selects either one of the first and second communication protocols.

3. The content sharing system as claimed in claim 2, wherein
the protocol selection unit of each of the terminal devices detects transmission frequency of the incremental update command generated by the content sharing application, and selects either one of the first and second communication protocols.

4. The content sharing system as claimed in claim 2, wherein
the protocol selection unit of each of the terminal devices detects remaining amount of a battery inside a power source device provided to itself, and selects either one of the first and second communication protocols.

5. The content sharing system as claimed in claim 1, wherein
the content sharing server comprises:
a first and a second mediating units which mediates the data communication between each of the terminal devices by the first and second communication protocols; and
a protocol determining unit which receives the desired protocols from each of the terminals devices, determines the determined protocol from the desired protocols of each of all the terminal devices, and transmits it to each of all the terminal devices.

6. The content sharing system as claimed in claim 5, wherein:
the protocol determining unit of the content sharing server determines the first communication protocol as the determined protocol when there is one or more terminal device whose desired protocol is the first communication protocol in each of the plurality of the terminal devices, and determines the second communication protocol as the determined protocol when the desired protocols of all the terminal devices are the second communication protocol.

7. The content sharing system as claimed in claim 1, wherein:
the first and the second communication protocols are SIP (Session Initiation Protocol) and HTTP (HyperText Transfer Protocol), respectively.

8. A terminal device which is capable of performing a voice call and data communication and constitutes a content sharing system by being mutually connected to switching equipment which mediates the voice call with other devices and to a content sharing server which mediates the data communication with the other devices, the terminal device comprising:
a voice call module which performs the voice call;
a content sharing application which generates an incremental update command in response to a user operation done by one of the terminal devices made on a same content stored inside for reflecting a content of the operation upon the same content in the other terminal device, and transmits it to the other terminal device;
a first and a second communication control units which perform the data communication with either one of a first and a second communication protocols; and
a protocol selection unit which selects either one of the first and second communication protocols according to a state of itself, transmits it to the content sharing server as a desired protocol, and employs a determined protocol received from the content sharing server as the communication protocol.

9. A protocol switching method used in a content sharing system constituted by mutually connecting a plurality of terminal devices capable of mutually performing a voice call and data communication, switching equipment, and a content sharing server, wherein:
a same content is stored inside the both terminal devices in advance;
the switching equipment mediates the voice call between the terminal devices;
the content sharing server mediates the data communication between each of the terminal devices;
a content sharing application in one of the terminal devices generates an incremental update command in response to a user operation done by one of the terminal devices made on the content for reflecting a content of the operation upon the same content in the other terminal device, and transmits it to the other terminal device;

a protocol selection unit of one of the terminal devices selects either one of the first and second communication protocols for performing the data communication according to the state of the terminal device, and transmits it to the content sharing server as a desired protocol;

a protocol determining unit of the content sharing server determines a determined protocol from the desired protocols received from all the terminal devices, and transmits it to all the terminal devices; and the protocol selection unit in all the terminal devices receives the determined protocol from the content sharing server, and employs the determined protocol as the communication protocol.

10. A non-transitory computer readable recording medium storing a protocol switching program used in a content sharing system constituted by mutually connecting a plurality of terminal devices capable of mutually performing a voice call and data communication, switching equipment, and a content sharing server, the program causing a computer provided to each of the terminal devices to execute:

a procedure for storing a content same as a content of another terminal device in advance;

a procedure for generating an incremental update command in response to a user operation made on the content for reflecting it upon the same content in the other terminal device, and transmitting it to the other terminal device;

a procedure for selecting either one of the first and second communication protocols according to a state of the terminal device to perform the data communication, and transmitting it to the content sharing server as a desired protocol; and a procedure for receiving a determined protocol from the content sharing sever, and employing the determined protocol as the communication protocol.

11. A content sharing system constituted by mutually connecting a plurality of terminal devices capable of mutually performing a voice call and data communication, switching equipment which mediates the voice call between each of the terminal devices, and a content sharing server which mediates the data communication between each of the terminal devices, wherein each of the terminal devices comprises:

voice call means for performing the voice call;

a content sharing application which generates an incremental update command in response to a user operation done by one of the terminal devices made on a same content stored inside the both terminals for reflecting a content of the operation upon the same content in the other terminal device, and transmits it to the other terminal device;

first and second communication control means for performing the data communication with either one of a first and a second communication protocols; and protocol selection means for selecting either one of the first and second communication protocols according to states of each of the terminal devices, transmitting it to the content sharing server as a desired protocol, and employing a determined protocol received from the content sharing server as the communication protocol.

12. A terminal device which is capable of performing a voice call and data communication and constitutes a content sharing system by being mutually connected to switching equipment which mediates the voice call with other devices and to a content sharing server which mediates the data communication with the other devices, the terminal device comprising:

voice call means for performing the voice call;

a content sharing application which generates an incremental update command in response to a user operation done by one of the terminal devices made on a same content stored inside for reflecting a content of the operation upon the same content in the other terminal device, and transmits it to the other terminal device;

first and second communication control means for performing the data communication with either one of a first and a second communication protocols; and protocol selection means for selecting either one of the first and second communication protocols according to a state of itself, transmitting it to the content sharing server as a desired protocol, and employing a determined protocol received from the content sharing server as the communication protocol.

* * * * *